United States Patent
Saeki et al.

(10) Patent No.: US 8,095,348 B2
(45) Date of Patent: Jan. 10, 2012

(54) SUPPORT SYSTEM, SUPPORT METHOD AND SUPPORT PROGRAM OF RESIN MOLDED ARTICLE

(75) Inventors: Junichi Saeki, Yokohama (JP); Tsutomu Kono, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 628 days.

(21) Appl. No.: 12/038,966

(22) Filed: Feb. 28, 2008

(65) Prior Publication Data
US 2008/0234989 A1 Sep. 25, 2008

(30) Foreign Application Priority Data

Mar. 22, 2007 (JP) ................. 2007-074108

(51) Int. Cl.
G06G 7/50 (2006.01)
G06G 7/58 (2006.01)
G06G 7/48 (2006.01)
G06F 7/60 (2006.01)
G06F 19/00 (2006.01)
B29C 39/00 (2006.01)
B29C 45/17 (2006.01)
G01N 3/60 (2006.01)

(52) U.S. Cl. ........... 703/9; 703/1; 703/2; 703/7; 700/97; 700/98; 700/197; 374/57; 264/40.3

(58) Field of Classification Search .................. 73/1.25, 73/1.26, 864.53; 703/7, 9, 2, 1; 700/97, 700/98, 197; 374/57; 264/40.3
See application file for complete search history.

(56) References Cited

U.S. PATENT DOCUMENTS

| | | | | |
|---|---|---|---|---|
| 5,031,108 A | * | 7/1991 | Fujita et al. ................. | 703/2 |
| 5,031,127 A | * | 7/1991 | Fujita et al. ................. | 703/2 |
| 5,035,598 A | * | 7/1991 | Fujita et al. ................. | 264/40.3 |
| 5,097,431 A | * | 3/1992 | Harada et al. ................ | 703/9 |
| 5,097,432 A | * | 3/1992 | Harada et al. ................ | 703/9 |
| 5,227,979 A | * | 7/1993 | Fukuhira et al. ............. | 700/197 |
| 5,756,017 A | * | 5/1998 | Togawa et al. ............... | 700/197 |
| 5,871,676 A | * | 2/1999 | Fujita et al. ................. | 264/40.1 |

(Continued)

FOREIGN PATENT DOCUMENTS

JP 11-232250 8/1999

(Continued)

*Primary Examiner* — Kamini S Shah
*Assistant Examiner* — Akash Saxena
(74) *Attorney, Agent, or Firm* — Antonelli, Terry, Stout & Kraus, LLP

(57) ABSTRACT

A model creation portion having a obstacle in a space includes two creation portions, one is to separate them and another is to combine them which handles, as porous media, an obstacle in which narrow spaces are regularly arranged. A thermosets flow analysis portion includes two analysis portions to separate and combine them, each of them has a viscosity equation for thermosets. The space/obstacle separation analysis portion analyzes by combining the viscosity equation with conservation equations of mass, momentum and energy, and the space/obstacle combination analysis portion analyzes by combining the viscosity equation with a conservation equation directed to a shape simplified as porous media. Resin flow behavior is analyzed while data in an interface between two models is delivered to each other, to accurately predict filling behavior at the time of injecting resin of thermosets molded articles having the complex obstacles.

14 Claims, 27 Drawing Sheets

U.S. PATENT DOCUMENTS

| | | | | |
|---|---|---|---|---|
| 5,900,259 A * | 5/1999 | Miyoshi et al. | | 264/40.7 |
| 6,214,279 B1 * | 4/2001 | Yang et al. | | 264/40.1 |
| 6,440,338 B1 * | 8/2002 | Kamiguchi et al. | | 264/40.1 |
| 6,816,820 B1 * | 11/2004 | Friedl et al. | | 703/2 |
| 6,856,856 B1 * | 2/2005 | Kolavennu et al. | | 700/197 |
| 7,096,083 B2 * | 8/2006 | Kaneto et al. | | 700/97 |
| 7,323,125 B2 * | 1/2008 | Uwaji et al. | | 264/40.1 |
| 2001/0028122 A1 * | 10/2001 | Narushima et al. | | 264/40.1 |
| 2004/0093104 A1 * | 5/2004 | Kaneto et al. | | 700/97 |
| 2004/0140579 A1 * | 7/2004 | Uwaji et al. | | 264/40.1 |
| 2004/0230411 A1 * | 11/2004 | Zheng et al. | | 700/97 |
| 2005/0046060 A1 * | 3/2005 | Nagaoka et al. | | 264/40.1 |
| 2005/0285855 A1 * | 12/2005 | Chien et al. | | 703/1 |
| 2007/0097117 A1 * | 5/2007 | Chien et al. | | 345/420 |
| 2008/0047655 A1 * | 2/2008 | Karagiannis et al. | | 156/109 |
| 2008/0221845 A1 * | 9/2008 | Yu et al. | | 703/2 |
| 2009/0132212 A1 * | 5/2009 | Herbst et al. | | 703/2 |
| 2010/0169062 A1 * | 7/2010 | Linn et al. | | 703/2 |

FOREIGN PATENT DOCUMENTS

| | | |
|---|---|---|
| JP | 2001-520378 | 10/2001 |
| JP | 2006-168300 | 6/2006 |
| JP | 2006-205740 | 8/2006 |
| WO | WO 99/19720 | 4/1999 |

* cited by examiner

FIG.6
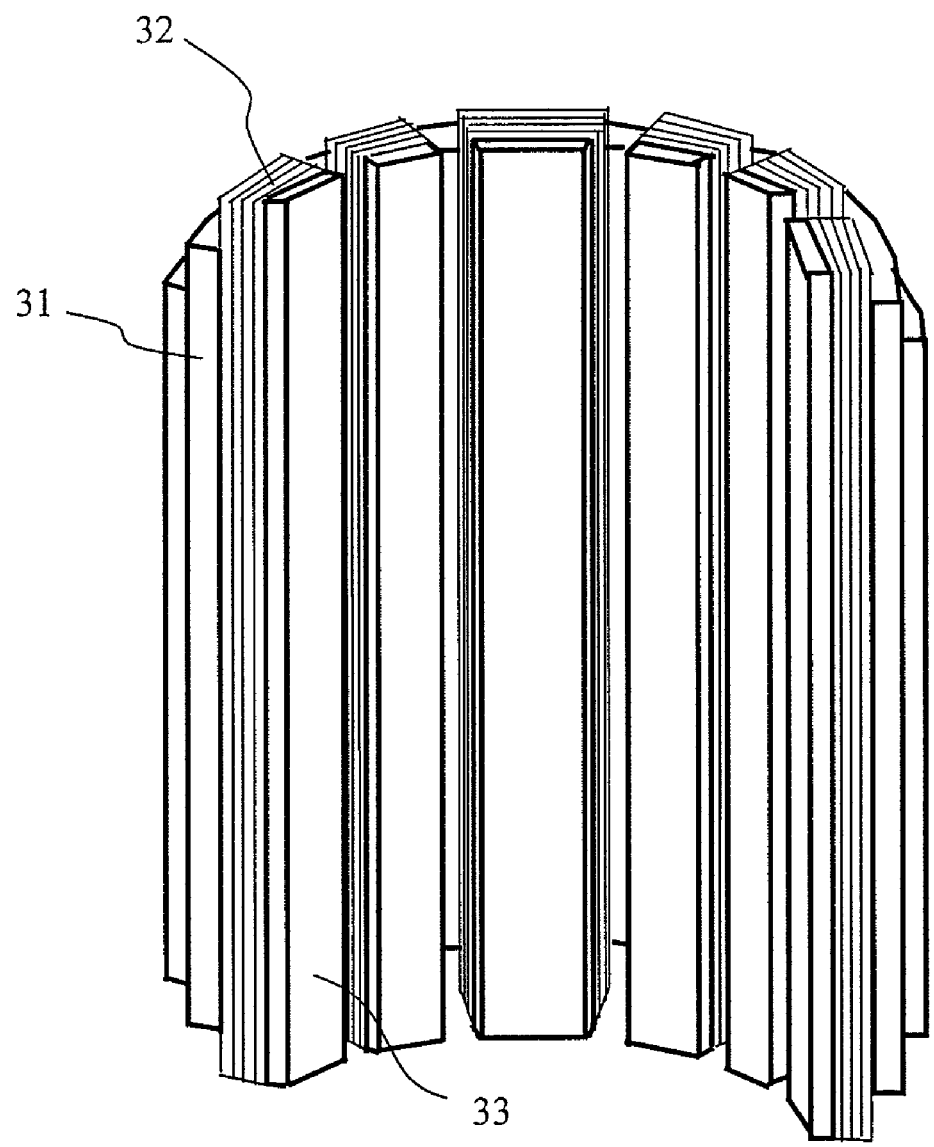
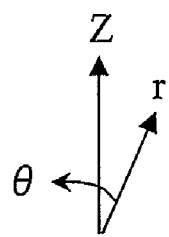

SUPPORT SYSTEM, SUPPORT METHOD AND SUPPORT PROGRAM OF RESIN MOLDED ARTICLE

The present application is based on and claims priority of Japanese patent application No. 2007-074108 filed on Mar. 22, 2007, the entire contents of which are hereby incorporated by reference.

BACKGROUND OF THE INVENTION

1. Field of the Invention

The present invention relates to a technique for supporting design of a resin molded article using thermosets.

2. Description of the Related Art

Cured materials of thermosets have superior properties such as adhesive characteristics, mechanical strength, characteristics of electrical insulation and chemical durability, and have been widely employed as electrical insulated structural material of electrical equipment and material used for encapsulation of electronic and structural components. Thermosets have been increasingly needed to fix a component around which a metal coil is wound, such as a motor, a generator and medical inspection equipment among them. In this process, a general system is that liquid resin is heated and pressurized externally to fill a gap in an apparatus or a coil, and after the resin is cured, a product is taken out. Thermosets have a complex viscosity change depending on temperature change during flowing, and it has become important to apply a simulation technique run on a computer in that an appropriate analytical model is formed, and change in physical properties such as temperature, viscosity and flow velocity is calculated by numerical analysis, and faults such as voids and shortage of filling are beforehand predicted, and a structure or a process without any problem is selected.

The present invention is directed to a system in that a process for encapsulating, with thermosets, a product in which obstacles having many, very narrow gaps, such as a coil, are regularly arranged is quickly and accurately simulated, and to a method thereof.

Japanese Patent Laid-Open Publication No. 2006-205740 (Patent Document 1) discloses a device and a method for consistently analyzing flow behavior of thermosets and even residual strain after curing based on a curing reaction rate model. Japanese Patent Laid-Open Publication No. 11-232250 (Patent Document 2) discloses a device and a method for analyzing the flow behavior of thermosets also based on a curing reaction rate model.

Japanese Patent Laid-Open Publication No. 2006-168300 (Patent Document 3) relates to a method that predicts impregnation behavior of thermosets, assuming that a shape in which narrow gaps are regularly arranged is viewed as porous media, and based on Law of D'Arcy that is a conventional, flow calculation technique of the porous media. Japanese Patent Laid-Open Publication No. 2001-520378 (Patent Document 4) relates to a method that predicts an impregnation time in a process in which a winding portion in a generator, a turbine and the like is impregnated with thermosets, also based on Law of D'Arcy.

SUMMARY OF THE INVENTION

Japanese Patent Laid-Open Publication No. 2006-205740 (Patent Document 1) and Japanese Patent Laid-Open Publication No. 11-232250 (Patent Document 2) have a considerably strict, analytical model, and it is necessary to use vast amounts of meshes for a shape having many, very narrow gaps, such as a coil, which presents a problem that a computation does not end within a practical time frame because of an increased computational time. Japanese Patent Laid-Open Publication No. 2006-168300 (Patent Document 3) has problems that information about viscosity change of resin cannot be obtained because a model equation for describing the viscosity change of resin is not used, and an intricate shape including a narrow portion viewed as porous media and a wide portion not viewed as porous media cannot be dealt with. Japanese Patent Laid-Open Publication No. 2001-520378 (Patent Document 4) also has problems that information about the viscosity change of resin cannot be obtained because the model equation for describing the viscosity change of resin is not used, and an intricate shape including a narrow portion viewed as porous media and a wide portion not viewed as porous media cannot be dealt with.

As described above, there has not been a quick and accurate flow-simulation technique directed to a process for encapsulating, with thermosets, a product including both of a place in which obstacles having many, very narrow gaps are regularly arranged, such as a coil and a wide flow path, so that in developing a new product, a development period has been often delayed by repetition of trial production, evaluation and modification of specifications.

The present invention has been made in view of the above circumstances, and an object thereof is to quickly and accurately predict filling behavior when resin is injected to form a molded article of thermosets having complex obstacles.

A design support system of the present invention, to solve the problems described above, includes a model creation portion and a thermosets flow analysis portion. The model creation portion includes: a space/obstacle combination model creation portion for creating a space/obstacle combination model formed of a 3-dimensional solid element, in which a portion where narrow gaps are regularly arranged in a part of a molded article is viewed as porous media; and a space/obstacle separation model creation portion in which a resin flow space is separated from an obstacle in the other portion. The thermosets flow analysis portion includes: a space/obstacle combination analysis portion for analyzing a space/obstacle combination model region; and a space/obstacle separation analysis portion for analyzing a space/obstacle separation model region. The space/obstacle combination analysis portion and the space/obstacle separation analysis portion both have a viscosity equation for thermosets. The space/obstacle separation analysis portion, combining with conservation equations of mass, momentum and energy for describing movement of fluid and heat transfer, computes filling behavior of the thermosets, and the space/obstacle combination analysis portion, combining the viscosity equation with a conservation equation directed to a shape simplified as porous media, computes filling behavior of the thermosets, and numerical analysis is performed by using a finite difference method or a finite element method while information about physical properties in an interface between the space/obstacle combination model and the space/obstacle separation model is delivered to each other.

According to the present invention, because the space/obstacle combination model portion in which narrow gaps are regularly arranged can be viewed as porous media to simplify the analysis method thereof, a computational time can be largely shortened. On the one hand, in this portion, an inherent flow resistance of cross-section is independently set in 3-dimensional directions, and a dynamic equation is formed by expressing a pressure drop in the 3-dimensional directions as a product of the inherent flow resistance of cross-section, and viscosity, velocity and a flow length, and viscosity change peculiar to thermosets is computed in sequence by using the viscosity equation, which allows an accurate flow in the 3-dimensional directions to be predicted.

Further, the physical properties in the interface between the space/obstacle combination model and the space/obstacle separation model are delivered to each other, so that a solution of the flow behavior can be obtained simultaneously without any discrepancies between both models, and a complex structure can be accurately analyzed as a whole.

According to the present invention, the process of encapsulating, with thermosets, a product including both of a place in which obstacles having many, very narrow gaps are regularly arranged, and a wide flow path can be quickly and accurately simulated in flow-simulation.

BRIEF DESCRIPTION OF THE DRAWINGS

FIG. 6 is a cross-section view of a stator portion in a motor;

DETAILED DESCRIPTION OF THE PREFERRED EMBODIMENTS

Now, embodiments of the present invention will be hereinafter described referring to the accompanying drawings.

First Embodiment

Figure 1:
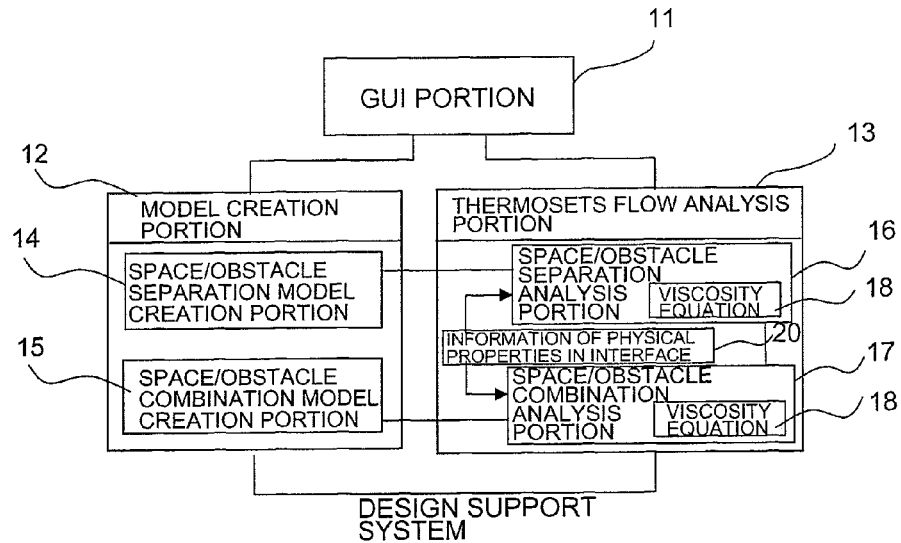
FIG. 1 is a schematic diagram of a configuration of a design support system of a first embodiment of the present invention.

FIG. 1 is a schematic diagram of a configuration of a design support system of a first embodiment of the present invention. As shown, the design support system of the present embodiment includes a graphical user interface (GUI) portion 11, a model creation portion 12 and a thermosets flow analysis portion 13. The model creation portion 12 is divided into a space/obstacle separation model creation portion 14 and a space/obstacle combination model creation portion 15.

The thermosets flow analysis portion 13 is divided into a space/obstacle separation analysis portion 16 and a space/obstacle combination analysis portion 17, and each of them analyzes correspondingly to a model respectively created by the space/obstacle separation model creation portion 14 and the space/obstacle combination model creation portion 15 while both exchange analysis data between them.

The GUI portion 11 receives an input such as various commands and information from a user through screen display and an input device such as a keyboard and a mouse, and displays the results of 3-dimensional flow analysis of thermosets.

The model creation portion 12 follows the commands received from the user through the GUI portion 11, and creates shape data (model data) of a resin molded article using thermosets to which design support is directed. The model creation portion 12 can use 3D-CAD, CAM, CAE and the like. The space/obstacle separation model creation portion 14 selects a place where a space and an obstacle can be separated from each other in the manner of the shape data, and sets the space directly to be a flow path, and divides it into predetermined meshes.

The space/obstacle combination model creation portion 15 specifies a place where an obstacle regularly arranged in an analysis object region and having a narrow, flow space, that is, a coil or a fibrous body is regularly installed, and divides it into predetermined meshes in each specified place, and sets a flow resistance of shape in the 3-dimensional directions. That is, each specified place is replaced with porous media having a predetermined flow resistance of shape in the 3-dimensional directions.

The thermosets flow analysis portion 13 analyzes change in viscosity, temperature, flow velocity, pressure, a position of flow front or the like of thermosets that is streaming in the analysis object region (3-dimensional flow analysis). The space/obstacle separation analysis portion 16 analyzes in the model created by the space/obstacle separation model creation portion 14.

Here, combining a viscosity equation 18 for thermosets with conservation equations of mass, momentum and energy for describing movement of fluid and heat transfer, numerical analysis is performed by a finite difference method or a finite element method, and temperature, pressure, velocity, viscosity, a position of flow front and the like in the 3-dimensional directions are computed.

The space/obstacle combination analysis portion 17 analyzes in the model created by the space/obstacle combination model creation portion 15. Here, combining the viscosity equation 18 with a conservation equation directed to a shape simplified as porous media, numerical analysis is performed by a finite difference method or a finite element method, and temperature, pressure, velocity, viscosity, a position of flow front and the like in the 3-dimensional directions are computed.

The space/obstacle combination analysis portion 17 is directed to a flow path shape in which holes having the same cross-sectional shape are regularly provided in the 3-dimensional directions, respectively, as porous media, and boundary conditions of the conservation equations are much simplified, thus a computational time can be largely shortened.

The space/obstacle separation analysis portion 16 and the space/obstacle combination analysis portion 17 exchange information 20 between them, which information 20 is of physical properties in an interface between the models that are the analysis regions for them, respectively, and created by the space/obstacle separation model creation portion 14 and the space/obstacle combination model creation portion 15, and based on the information 20, an updated state in each of the regions continues to be analyzed.

Figure 2:
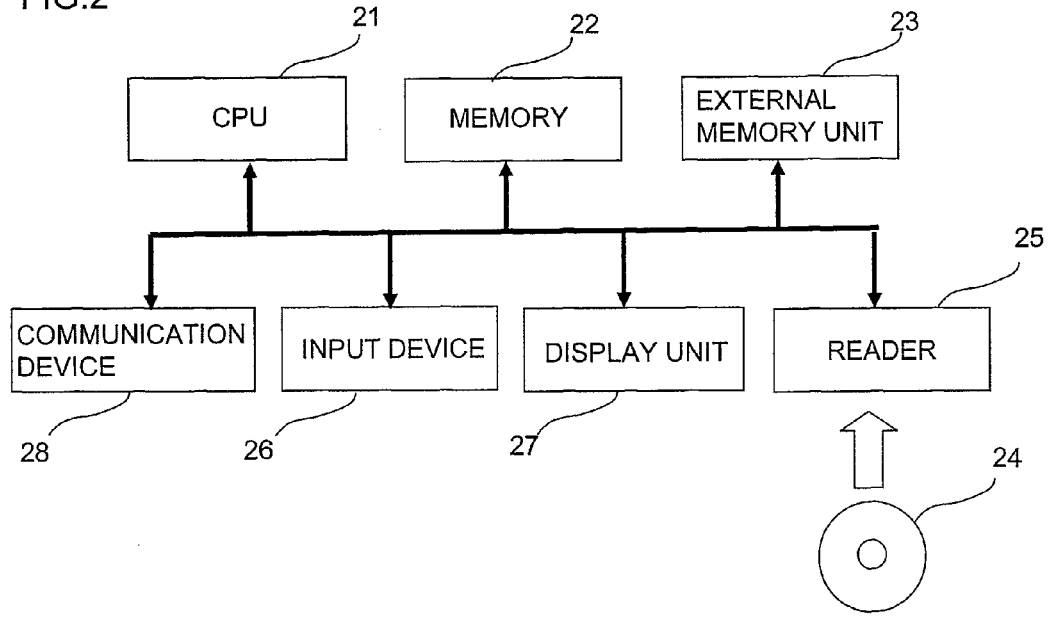
FIG. 2 shows an example of a hardware configuration of the design support system shown in FIG. 1.

The design support system configured as described above can be provided in a manner that, in a general computer system including, for example as shown in FIG. 2, a CPU 21, a memory 22, an external memory unit 23 such as an HDD, a reader 25 for reading out information from a portable storage medium 24 such as a CD-ROM or a DVD-ROM, an input device 26 such as a keyboard and a mouse, a display unit 27 such as a CRT or an LCD, and a communication device 28 for communicating on a network such as the Internet, the CPU 21 executes a predetermined program loaded into the memory 22 (a 3D-CAD, CAM or CAE program for implementing the model creation portion 12, and a 3-dimensional flow analysis program for implementing the thermosets flow analysis portion 13).

These programs may be directly loaded from the storage medium 24 through the reader 25 or from a communication medium such as the Internet through the communication device 28 into the memory 22, or may be downloaded into the external memory unit 23 once, and then loaded into the memory 22.

Figure 3:
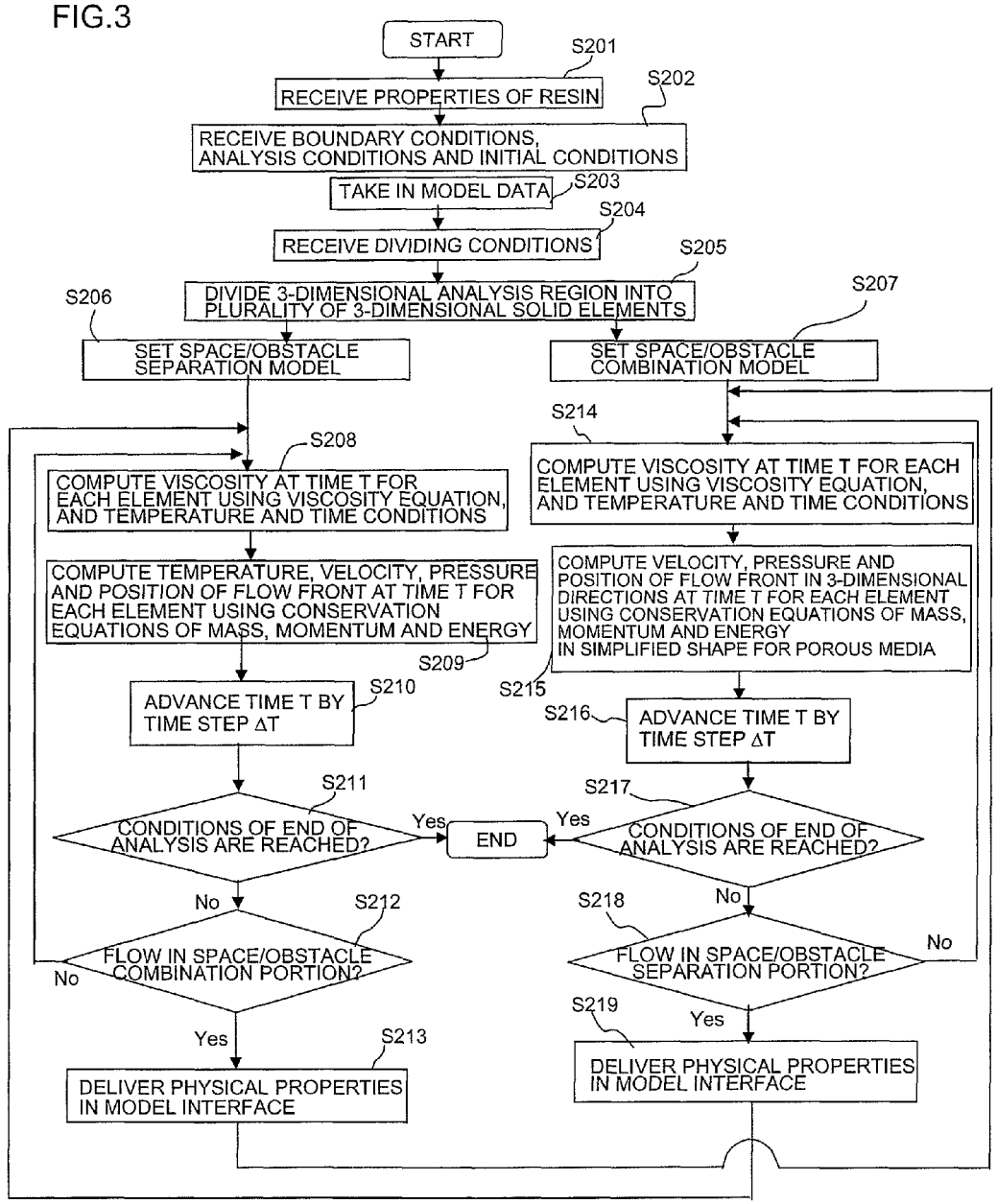
FIG. 3 is a flow diagram for illustrating 3-dimensional flow analysis processing of the first embodiment of the present invention.

FIG. 3 is a flow diagram of the first embodiment for illustrating processing of the support system described above.

The thermosets flow analysis portion 13 receives properties of thermosets necessary for 3-dimensional flow analysis from a user through the GUI portion 11 (S201). In the present embodiment, the properties are coefficients in a viscosity equation to be described below, specific heat, density, thermal conductivity and the like.

Next, the thermosets flow analysis portion 13 receives various conditions for 3-dimensional flow analysis from the user through the GUI portion 11 (boundary conditions, analysis conditions and initial conditions) (S202). The various conditions include an initial temperature, an inflow velocity, a mold temperature, shape data of an injection portion and conditions of end of analysis (upper limits of a flow time, viscosity and pressure, and the like).

The model creation portion 12 receives a command for 3-dimensional flow analysis from the user through the GUI portion 11. The model creation portion 12 takes in model data specified by the command (S203). Next, the model creation portion 12 sets a resin filling region specified by the taken in data to a 3-dimensional analysis region. Then, the model creation portion 12 receives conditions in dividing the 3-dimensional analysis region into 3-dimensional solid elements from the user through the GUI portion 11 (the number of division, an element size and the like) (S204). Then, according to the received dividing conditions, the 3-dimensional analysis region is divided into a plurality of 3-dimensional solid regions (S205).

Next, the user selects, through the GUI portion 11, a place where a space can be directly set to be a flow path from among the plurality of 3-dimensional solid regions set in the model creation portion 12, and sets a space/obstacle separation model (S206). This is directly saved in the space/obstacle separation model creation portion 14 of the model creation portion 12. On the one hand, a place in the model data having an obstacle regularly arranged in the analysis object region and having a narrow flow space is set as a space/obstacle combination model in the space/obstacle combination model creation portion 15 (S207). A specific example of this modeling method will be described below.

Next, a specific example of the space/obstacle separation analysis portion 16 in the thermosets flow analysis portion 13 will be described. The space/obstacle separation analysis portion 16 sets an initial time to a time t. Then, using a viscosity equation 18 for thermosets, and the temperature and time conditions, viscosity at a time t is computed for each of the 3-dimensional solid elements (S208).

In addition, an isothermal viscosity equation may be expressed by the following equations 1 to 4.

$$\eta = \eta_0 ((1+t/t_0)/(1-t/t_0))^C \qquad \text{Equation 1}$$

$$\eta_0 = a \exp(b/T) \qquad \text{Equation 2}$$

$$t_0 = d \exp(e/T) \qquad \text{Equation 3}$$

$$C = f/T - g \qquad \text{Equation 4}$$

Figure 4:
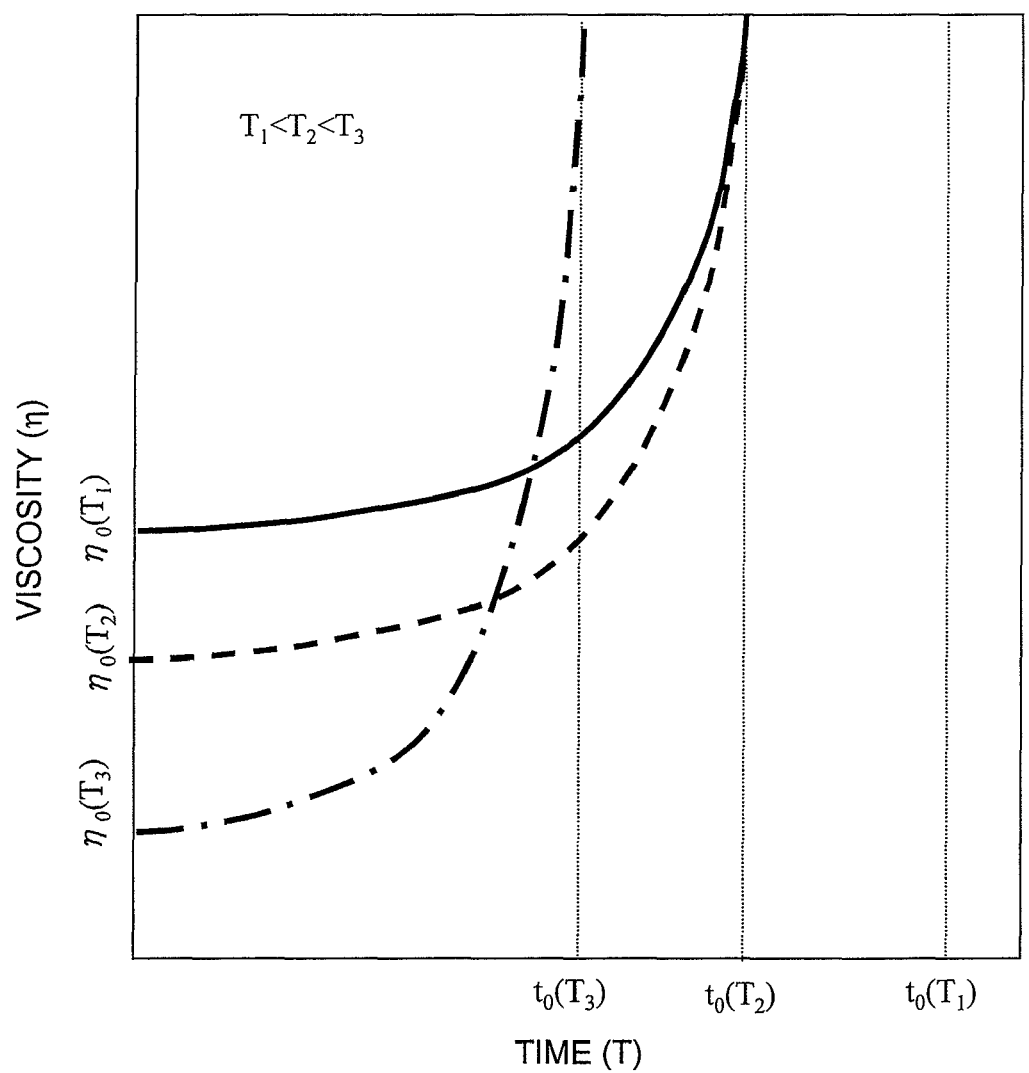
FIG. 4 shows isothermal viscosity change in a viscosity equation of the first embodiment of the present invention.

Where, $\eta$ is viscosity, t is time, T is temperature, $\eta_0$ is an initial viscosity, $t_0$ is a gel time, C is a coefficient of determining viscosity rise, and a, b, d, e, f and g are coefficients inherent to material. FIG. 4 shows isothermal characteristics of this viscosity equation. At each temperature T, viscosity turns into the initial viscosity at a time t, and the viscosity increases as curing reaction advances with time, and the viscosity reaches an infinite value at the gel time. Further, as the temperature goes high, the initial viscosity becomes low and the gel time is shortened.

In molding of thermosets, the resin is brought into a non-isothermal state that it streams while being subject to heat from a mold. Viscosity change in this state can be predicted by the following approach.

Substituting the following equations in the equation 1, $$\mu = (\eta/\eta_0)^{(1/C)} \qquad \text{Equation 5}$$

$$\tau = t/t_0 \qquad \text{Equation 6}$$

then, the next equation is obtained.

$$\mu = (1+\tau)/(1-\tau) \qquad \text{Equation 7}$$

Figure 5A:
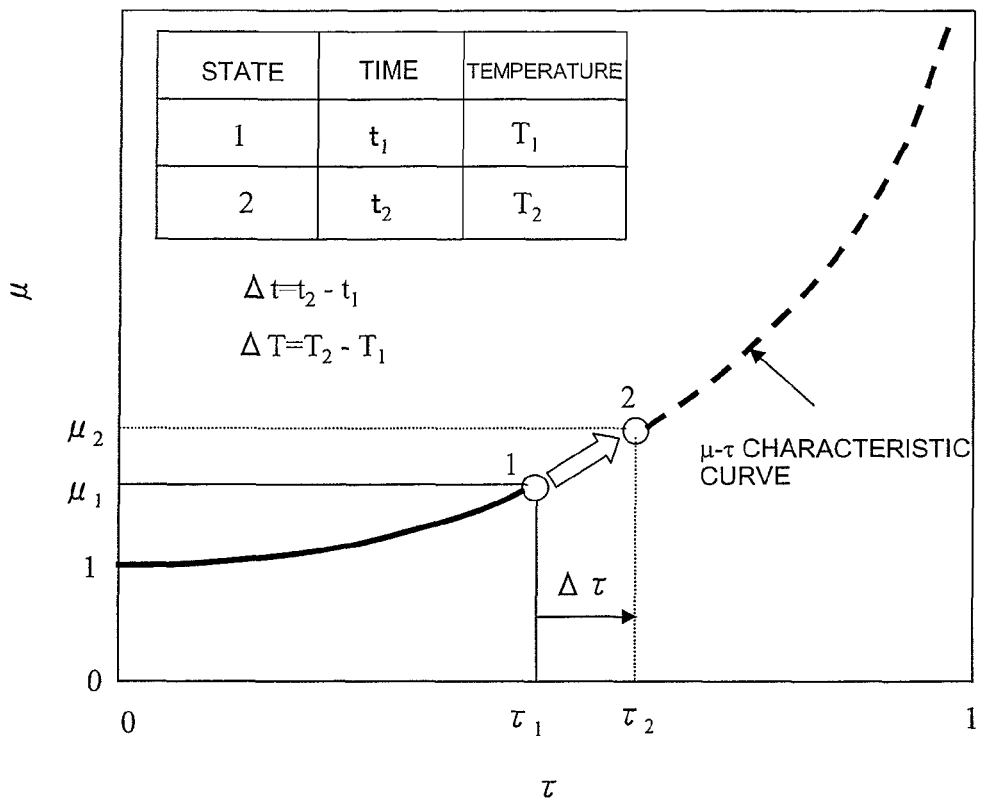
FIG. 5 illustrates, in views (a) and (b), handling of non-isothermal viscosity change in the first embodiment of the present invention.

Where, $\mu$ is a non-dimensional viscosity, and $\tau$ is a non-dimensional time. FIG. 5(a) shows a $\mu$-$\tau$ characteristic curve. Now, assuming that a state 1 being at a time $t_1$ and having a temperature $T_1$ changes by infinitesimal amounts $\Delta t$ and $\Delta T$, respectively, and turns into a state 2 being at a time $t_2$ and having a temperature $T_2$. Accordingly, in the μ-τ characteristic curve, $\tau_1$ changes by $\Delta\tau$, and $\mu_1$ turns into $\mu_2$. That is, a phenomenon that the time and the temperature concurrently change can be handled as change in one curve. Assuming that $\Delta\tau$ is an infinitesimal amount, then the next equation may be approximately formed.

$$\mu_2 = \mu_1 + (d\mu/d\tau)_{\mu_1 \Delta\tau} \qquad \text{Equation 8}$$
$$= \mu_1 + 2\Delta\tau/((1-\tau_1)^2)$$

Further, $\Delta\tau$ may be approximately obtained from the following equation.

$$\Delta\tau = (\partial\tau/\partial t)_{\tau_1 \Delta t} + (\partial\tau/\partial T)_{\tau_1 \Delta T} \qquad \text{Equation 9}$$
$$= \Delta t/(d \exp(e/T_1)) + \Delta T e \tau_1 /(T_1^2)$$

Substituting the equation 9 into the equation 8, $\mu_2$ can be obtained using known values. From the equation 7, the following equation may be formed.

$$\tau_2 = (\mu_2 - 1)/(\mu_2 + 1) \qquad \text{Equation 10}$$

From the equation 5, the viscosity in the state 2 may be obtained from the following equation.

$$\eta_2 = \eta_0(T_2)\mu_2^{C(T2)} \qquad \text{Equation 11}$$

Figure 5B:
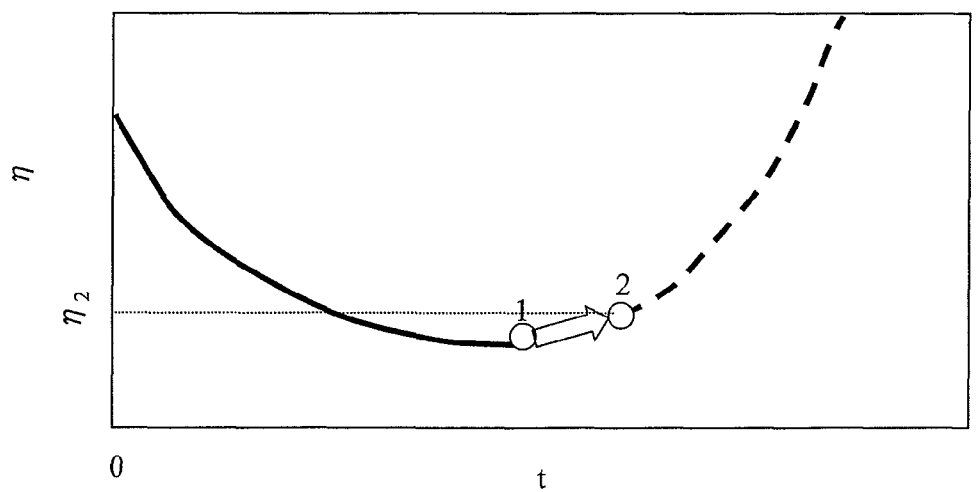

Repeating the procedures described above from τ=0 to a non-dimensional time viewed as 1, an actual viscosity change can be computed from the initial state to the gelation shown in FIG. 5(*b*).

Next, temperature, velocity, pressure, a position of flow front and the like at the time t are computed for each element using conservation equations of mass, momentum and energy (S209).

In addition, a conservation equation of mass may be expressed by the following equation 12.

$$(\partial\rho/\partial t) + \rho(\nabla \cdot v) = 0 \qquad \text{Equation 12}$$

Also, a conservation equation of momentum may be expressed by the following equation 13.

$$\rho(\partial v/\partial t + v \cdot \nabla v) = -\nabla p + \nabla \cdot \tau^* + \rho g \qquad \text{Equation 13}$$

Also, a conservation equation of energy may be expressed by the following equation 14.

$$\rho C p(\partial T/\partial t + v \cdot \nabla T) = \lambda \nabla^2 T + \tau^* \cdot \nabla v \qquad \text{Equation 14}$$

Where, ρ is density, t is time, ∇ is a nabla, v is a velocity vector, p is pressure, τ* is a deviatoric stress tensor, g is a gravitational vector, Cp is specific heat at constant pressure, T is temperature, and λ is thermal conductivity. In addition, τ* is computed using the viscosity η obtained at S208 and a velocity gradient. The equations 12 to 14 are 3-dimensional, partial differential equations, and exact solutions thereof cannot be obtained, and approximate solutions of temperature, velocity, pressure, a position of flow front and the like are obtained by a numerical analysis technique such as a finite difference method or a finite element method.

Next, the time t is advanced by a time step $\Delta t$ (S210). This prepares for analysis at a next time. Next, the conditions of end of analysis are judged (S211). Here, the values computed at S209 are compared with the upper limits of a flow time, viscosity and pressure, and the like set according to the conditions received at S202, and when the conditions of end of analysis are met, the computation ends. When the conditions of end of analysis are not met, it is determined whether thermosets flow in the space/obstacle combination portion or not (S212). That is, it is determined whether the position of flow front computed at S209 reaches the space/obstacle combination model (S207) portion or not.

Here, when the position of flow front does not reach the space/obstacle combination model (S207) portion, return to S208, and computation at the updated time set at S210 is repeated. When the position of flow front reaches the space/obstacle combination model (S207) portion at S212, information 20 of physical properties in a model interface is delivered to the space/obstacle combination analysis portion 17 (S213). At this time, a place in contact with a front surface of the space/obstacle combination model (S207) portion and the physical properties of the viscosity, the pressure, the temperature and the like are delivered that are necessary for the space/obstacle combination analysis portion 17.

Next, a specific example of setting the space/obstacle combination model (S207) will be described. Here, Law of D'Arcy is used that is an analysis technique when fluid flows very slowly in a narrow space in which obstacles are regularly arranged. A general Law of D'Arcy (in one-dimensional direction) may be shown by the equation 15.

$$\Delta P = K \cdot u \cdot \rho \cdot L \qquad \text{Equation 15}$$

Where, $\Delta P$ is a pressure drop, K is a coefficient of flow resistance, u is velocity, ρ is density, and L is a flow length. The equation 15 is an expression based on empirical rules in that the conservation equation of momentum of fluid shown in the equation 13 is applied to a flow at a very slow velocity, and a product of a coefficient of dynamic viscosity formed by dividing viscosity by density and a flow resistance included in a cross-section shape is expressed by the coefficient of flow resistance K as a whole. Accordingly, in a shape in which uniform, narrow gaps are provided in one direction, flow behavior can be computed when the value K is appropriately set.

That is, it is not necessary to exactly model an assembly of narrow gaps, and a computation time can be largely shortened. When fluid has a constant viscosity as water has, to the fluid, the form of the equation 15 is directly applied, but thermosets have a viscosity that largely changes depending on temperature with time, and the viscosity has to be separated. Then, separating the viscosity, the equation 15 may turn to the equation 16.

$$\Delta P = \beta \cdot \eta \cdot u \cdot L \qquad \text{Equation 16}$$

Where, β is an inherent flow resistance of cross-section shape. The viscosity η is successively obtained by the technique shown with respect to the equations 1 to 11, and substituted in the equation 16, which allows fluid in which viscosity change peculiar to thermosets will occur to be analyzed. In addition, when 3-dimensional flow analysis is performed, the equation 16 may be shown by equations 17 to 19, respectively, in the rectangular coordinate system.

$$\Delta P_x = \beta_x \cdot \eta \cdot u_x \cdot L_x \qquad \text{Equation 17}$$

$$\Delta P_y = \beta_y \cdot \eta \cdot u_y \cdot L_y \qquad \text{Equation 18}$$

$$\Delta P_z = \beta_z \cdot \eta \cdot u_z \cdot L_z \qquad \text{Equation 19}$$

Where, suffixes show values in x, y and z directions, respectively. The viscosity computed by the viscosity change prediction technique shown with respect to the equations 1 to 11 is successively substituted in the equations 17 to 19, and a solution is obtained simultaneously with the equation 12 of the conservation equation of mass and the equation 14 of the conservation equation of energy by numerical analysis, which allows 3-dimensional flow behavior of thermosets in the space/obstacle combination model creation portion 15 to be analyzed. In addition, in the space/obstacle combination model creation portion 15, at the process of S207, a relevant place of the assembly of the 3-dimensional solid elements set at S205 is divided into blocks, and each is assigned to the space/obstacle combination model, and the inherent flow resistance of cross-section shape in the 3-dimensional directions is set for each block.

Next, a specific example of the space/obstacle combination analysis portion 17 will be described. First, viscosity is computed at the time t for each element using the viscosity equation, and the temperature and time conditions (S214). The computation technique of the viscosity is the same as that described with reference to the equations 1 to 11. Here, when the resin, not passing through the space/obstacle separation model region, flows in, the viscosity is computed using the temperature and the initial time set according to the initial conditions at S202. On the one hand, when the resin, passing through the space/obstacle separation model region, flows in, viscosity is newly computed using values necessary for viscosity computation in the equations 1 to 11, delivered at S213 for delivery of the information 20 of physical properties in the model interface.

Next, velocity, pressure and a position of flow front in the 3-dimensional directions at the time t are computed for each element using conservation equations of mass, momentum and energy directed to a simplified shape as porous media (S215). Here, a target is the path shape in which holes having the same cross-section shape are regularly provided in the 3-dimensional directions, respectively, as porous media, and boundary conditions of the conservation equations are much simplified and the conservation equations of momentum themselves turn into simple forms as the equations 17 to 19, so that a computation time can be largely shortened.

Next, the time t is advanced by the time step Δt (S216). This prepares for analysis at a next time. Next, the conditions of end of analysis are judged (S217). Here, the values computed at S215 are compared with the upper limits of a flow time, viscosity and pressure, and the like set according to the conditions received at S202, and when the conditions of end of analysis are met, the computation ends. When the conditions of end of analysis are not met, it is determined whether the thermosets flow in the space/obstacle separation portion (S218). That is, it is determined whether the position of flow front computed at S215 reaches the space/obstacle separation model (S206) portion or not.

Here, when the position of flow front does not reach the space/obstacle separation model (S206) portion, the process returns to S214 and computation at a new time set at S216 is repeated. When the position of flow front reaches the space/obstacle separation model (S206) portion at S218, information 20 of physical properties in a model interface is delivered to the space/obstacle separation analysis portion 16 (S219). At this time, a place in contact with a front surface of the space/obstacle separation model (S206) portion and the physical properties of the viscosity, the pressure, the temperature and the like are delivered that are necessary for the space/obstacle separation analysis portion 16.

The technique described above can quickly and accurately analyze the flow behavior of thermosets in the flow path having a narrow space in which obstacles are regularly arranged.

Next, a specific analysis example will be described. FIG. 6 is a cross-section view of a stator portion in a motor before encapsulation of resin. Coils 32 are wound by a plurality of steps and a plurality of rows around projections of a core 31 formed in a cylindrical shape having the projections in a constant pitch on the inside. To ends of the projections of the core 31, teeth 33 are attached, and the coil is prevented from dropping out. In addition, in analysis, a shape of the stator portion in the motor is conveniently shown in the cylindrical coordinate system, and here, a coordinate in a radial direction is indicated by r, a coordinate in a circumferential direction is indicated by θ, and a coordinate in an axial direction is indicated by z.

Figure 7:
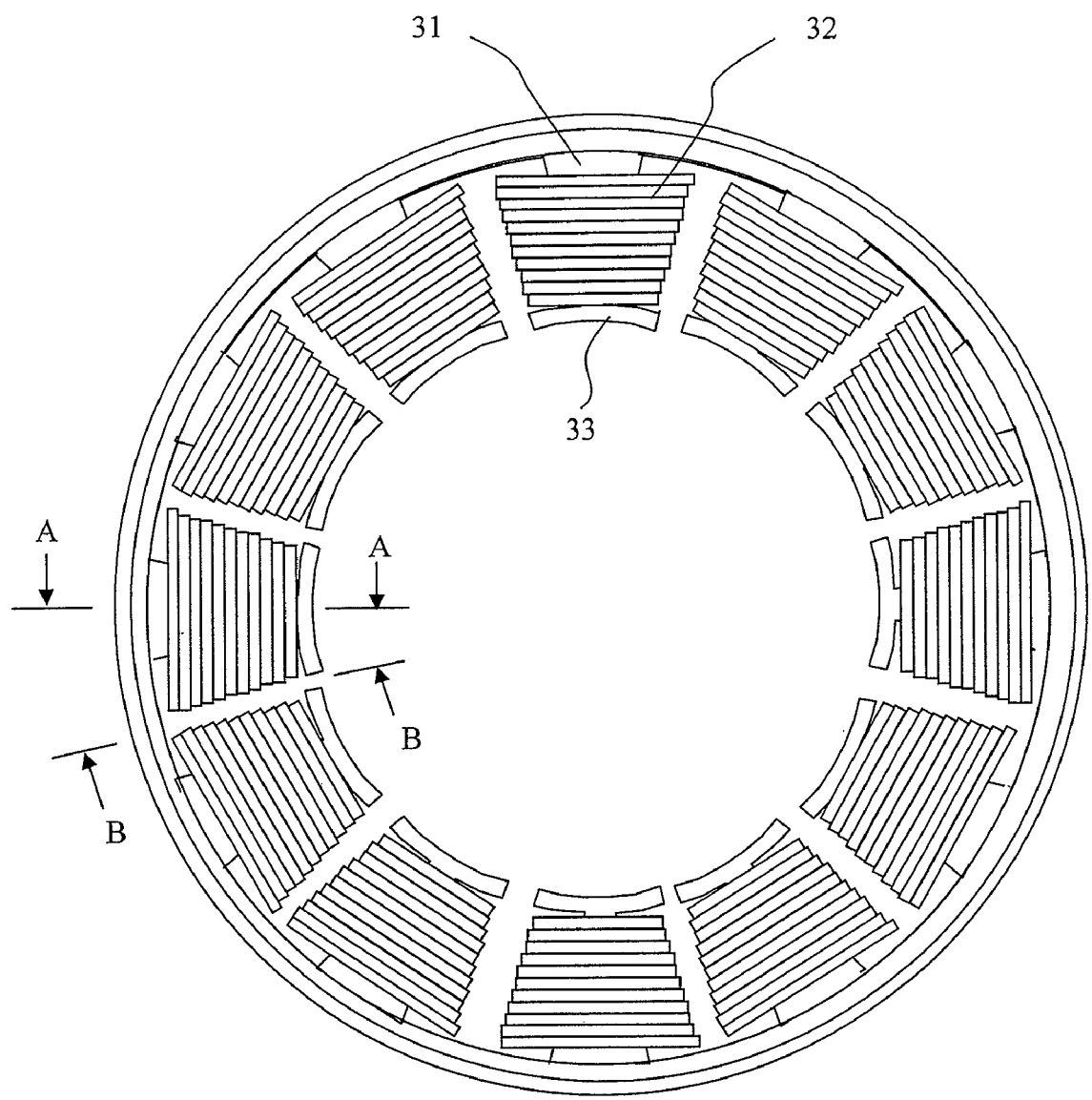
FIG. 7 is a top view of the stator portion in the motor.

FIG. 7 is a view of the whole circumference in the r-θ directions of the stator portion in the motor in FIG. 6 seen from above. The coils 32 are wound around the core 31 in a pitch of 30° at 12 places.

Figure 8:
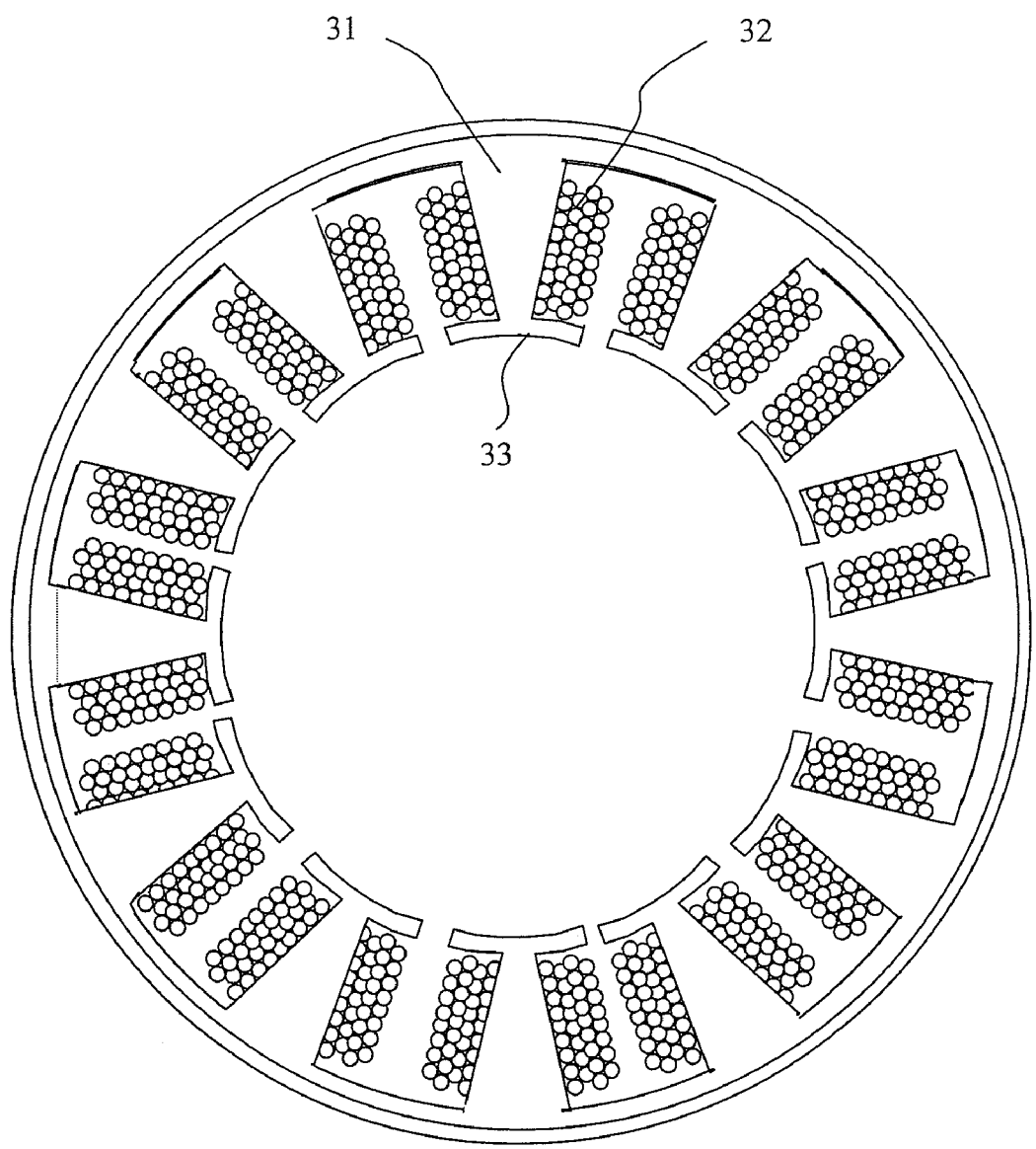
FIG. 8 is a cross-section view in a horizontal direction of the stator portion in the motor.

FIG. 8 is a cross-section view of the whole circumference in the r-θ directions in the central portion in the z direction of the stator portion in the motor in FIG. 6. The coils 32 are wound around the core 31 by multiple steps and rows.

Figure 9:
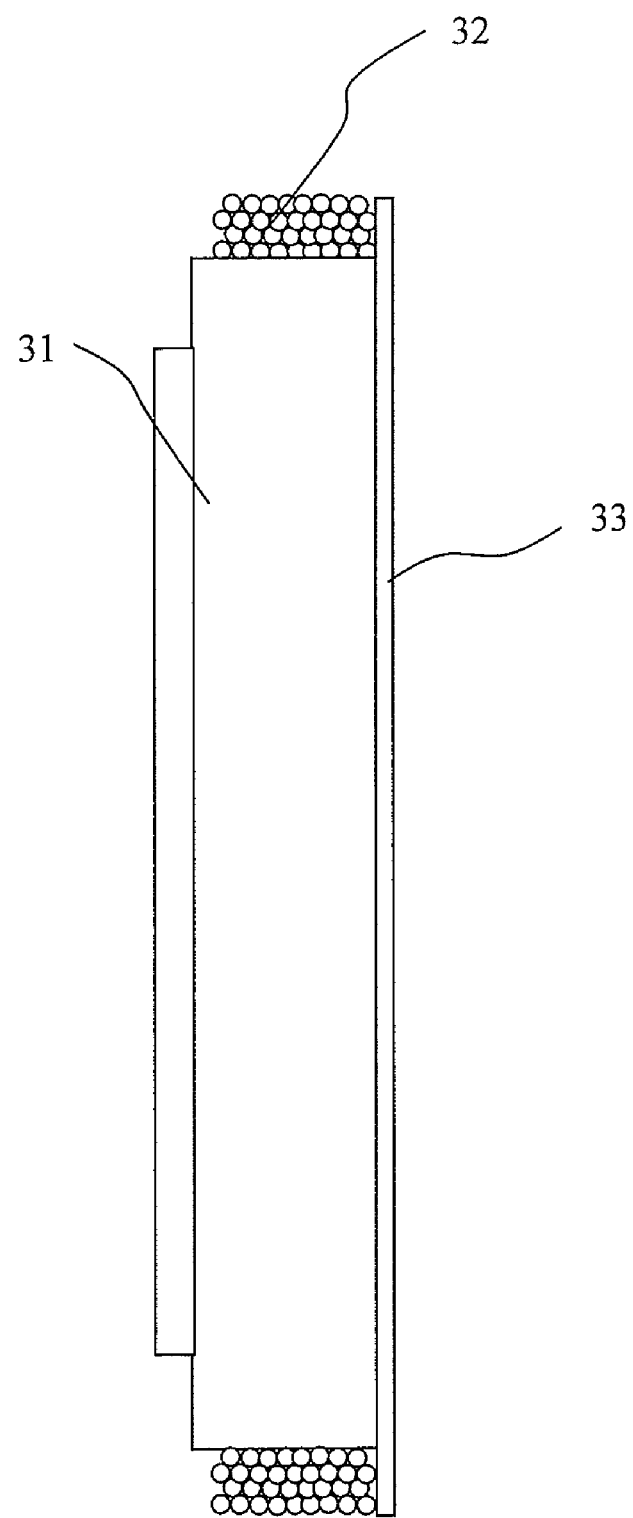
FIG. 9 is a cross-section view in a vertical direction of the stator portion in the motor.

FIG. 9 is a cross-section view taken along A-A in FIG. 7. In this cross-section view, the coil 32 lies above and below the core 31, and is prevented from dropping out by the teeth 33.

Figure 10:
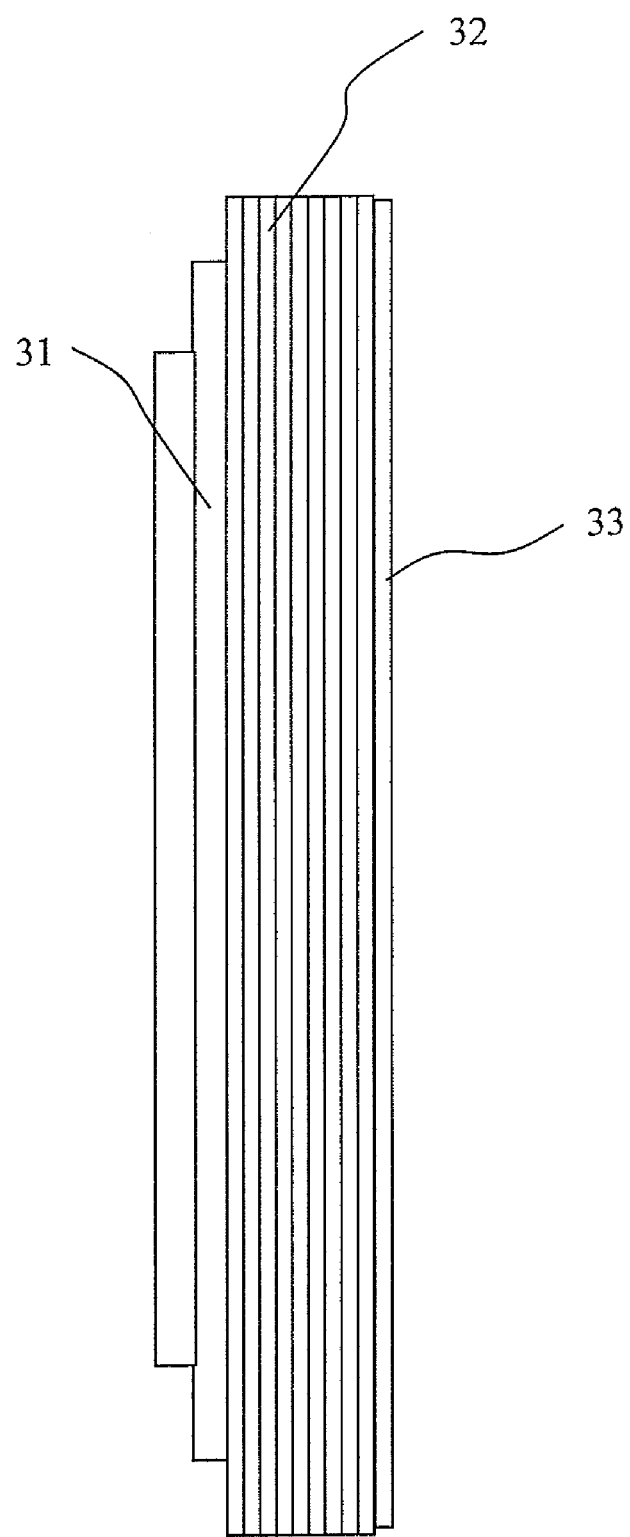
FIG. 10 is a cross-section view in the vertical direction of the stator portion in the motor at a different position from that in FIG. 9.

FIG. 10 is a cross-section view taken along B-B in FIG. 7. The coil 32 is wound around the core. In addition, an assembly of the coil 32 is modeled by the space/obstacle combination model creation portion 14 as porous media.

Figure 11:
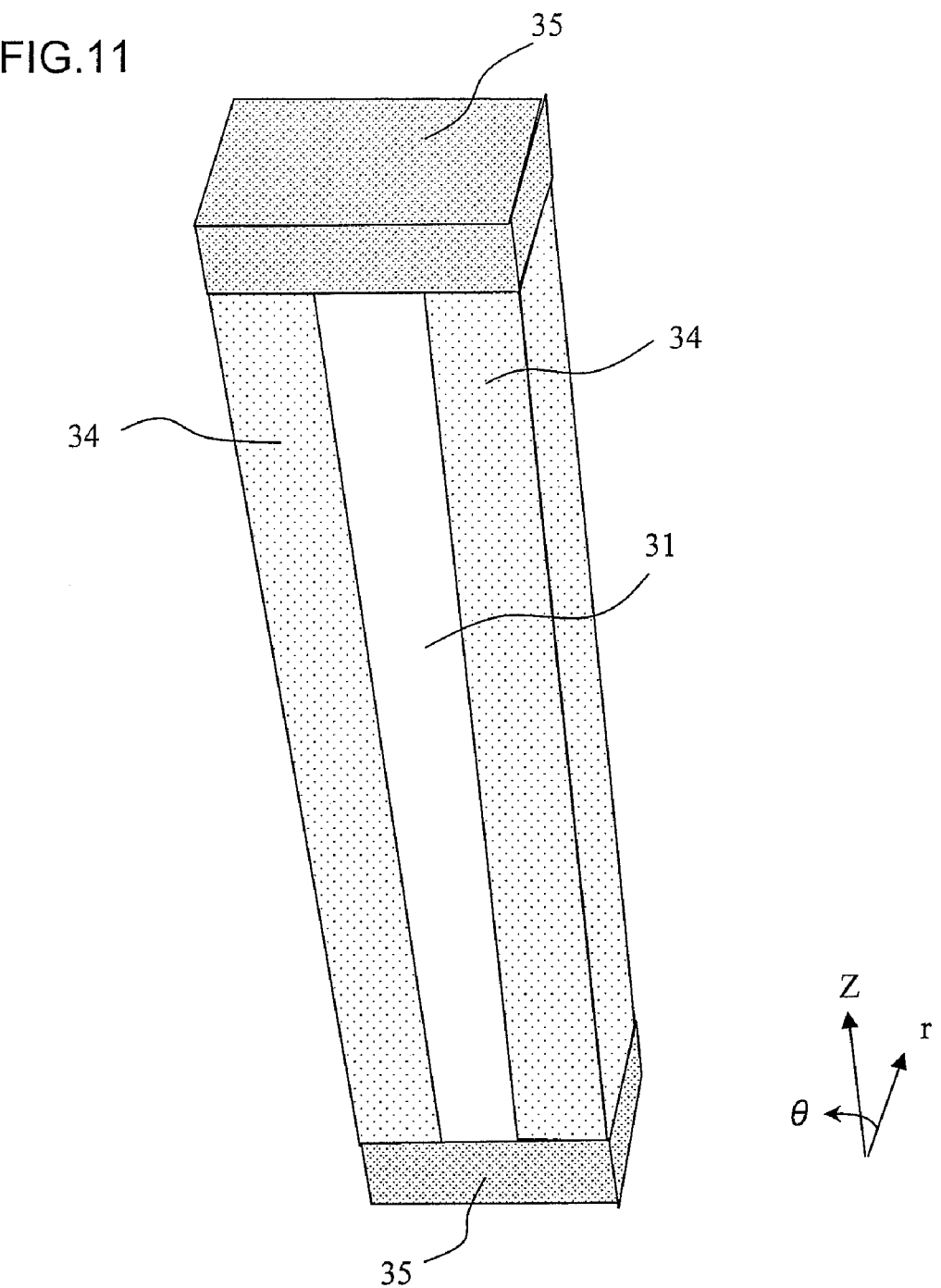
FIG. 11 is an illustration of modeling of a coil portion.

FIG. 11 schematically shows modeling of the assembly of the coil 32. The coil 32 is wound around one of the projections of the core 31, and a flow along a winding direction has a small flow resistance, and a flow in a direction perpendicular to the winding direction has a large flow resistance. Accordingly, here, in the coil 32 on the right and left sides of the core 31, the inherent flow resistance of cross-section shape was set to take a smaller value in the z direction, and a larger value in the θ and r directions, and this block was set as a space/obstacle combination model (1) 34. On the one hand, in the coil 32 on upper and lower portions of the core 31, the inherent flow resistance of cross-section shape was set to take a smaller value in the θ direction, and a larger value in the r and z directions, and this block was set as a space/obstacle combination model (2) 35.

Figure 12:
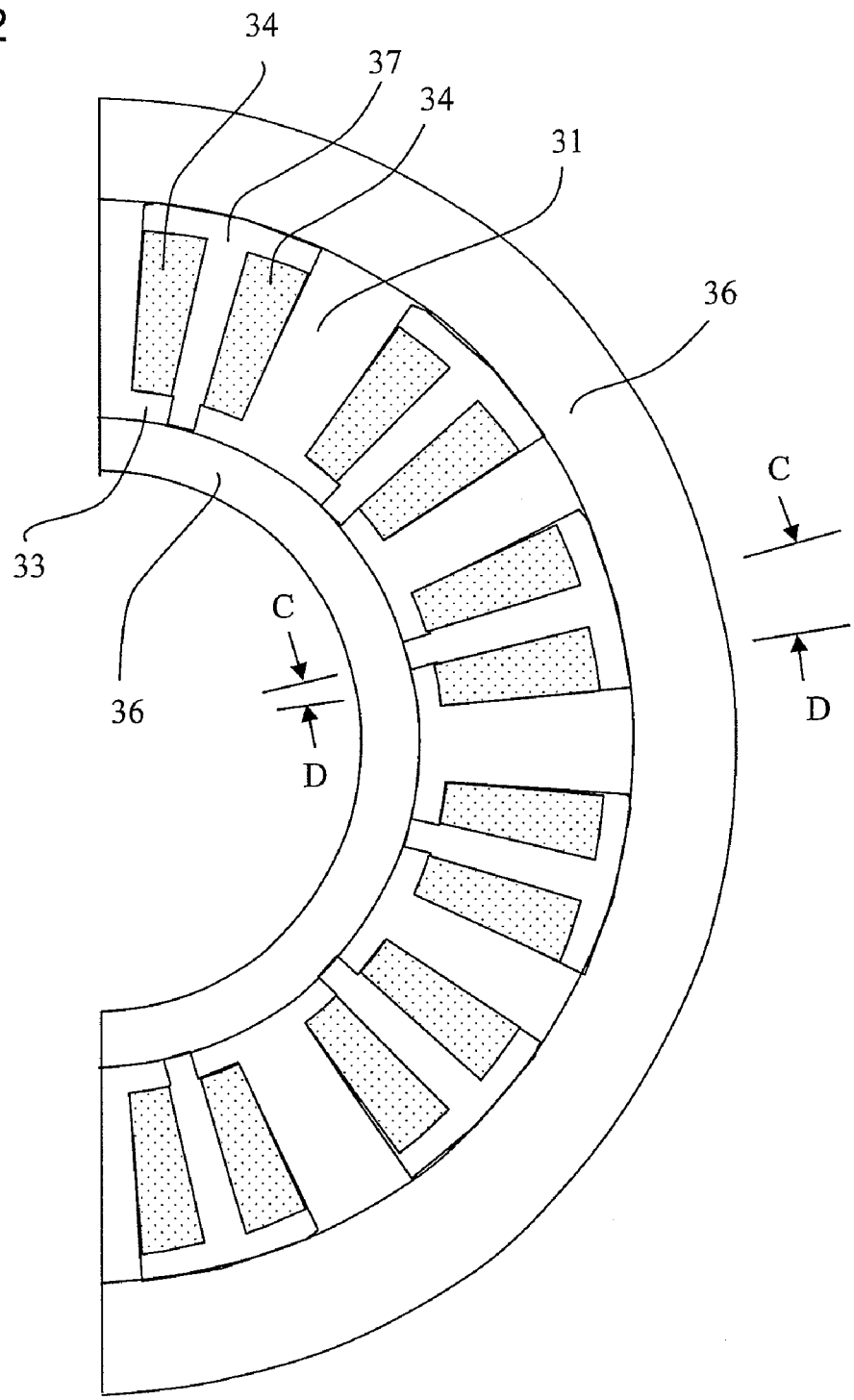
FIG. 12 is a cross-section view in the horizontal direction of a modeled stator portion in the motor in a mold.

FIG. 12 is a cross-section view of half of the circumference in the r-θ directions in the central portion in the z direction of the model shape set for flow analysis of thermosets. The space/obstacle combination model (1) 34 is placed around each core 31. The stator portion in the motor is surrounded by a mold 36. In addition, a portion was created by the space/obstacle separation model creation portion 14 all except for the space/obstacle combination model (1) 34 and the space/obstacle combination model (2) 35, and the core 31, the teeth 33 and the mold 36 were registered as a solid obstacle, and a space except for them was a cavity 37 in which resin flows.

Figure 13:
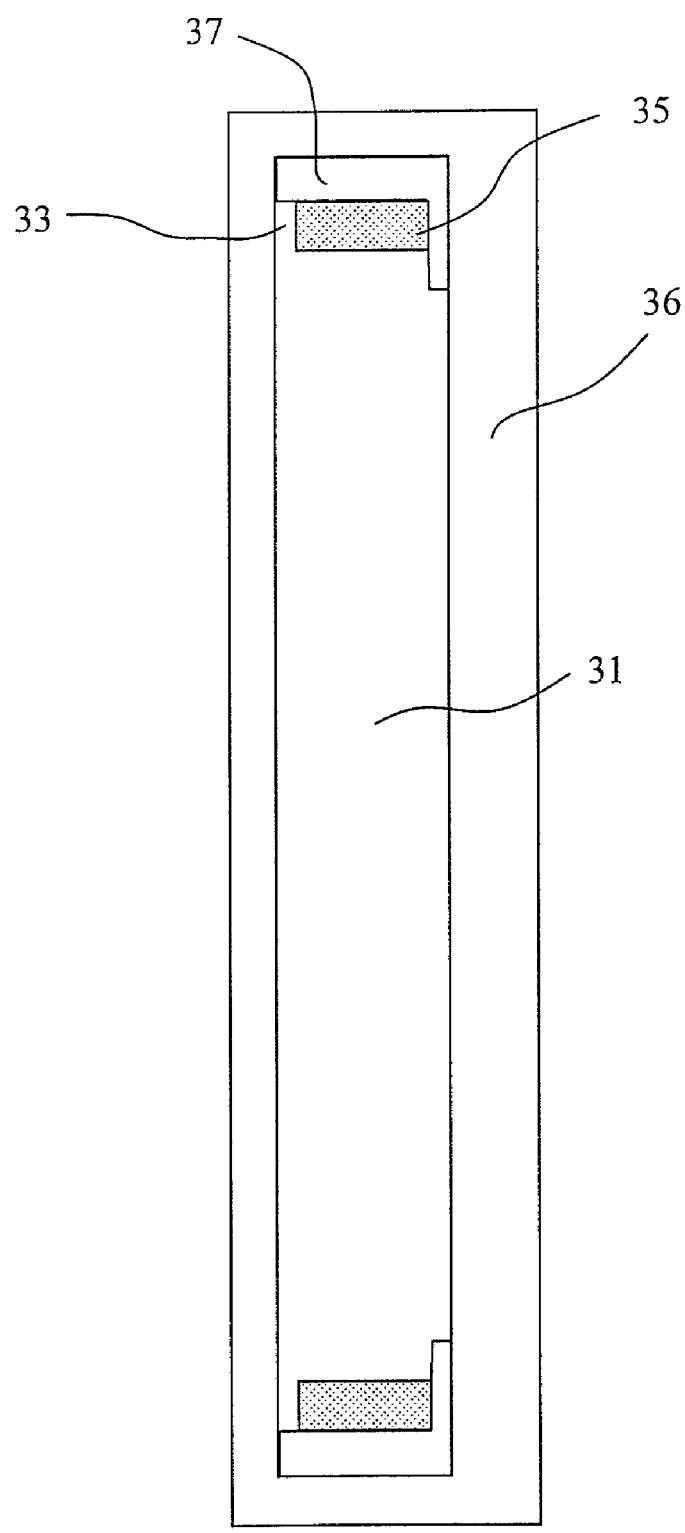
FIG. 13 is a cross-section view in the vertical direction of the modeled stator portion in the motor in the mold.

FIG. 13 is a cross-section view of the whole region in the r-z directions in the portion C-C in FIG. 12. In this cross-section, the space/obstacle combination model (2) 35 is placed above and below the core 31.

Figure 14:
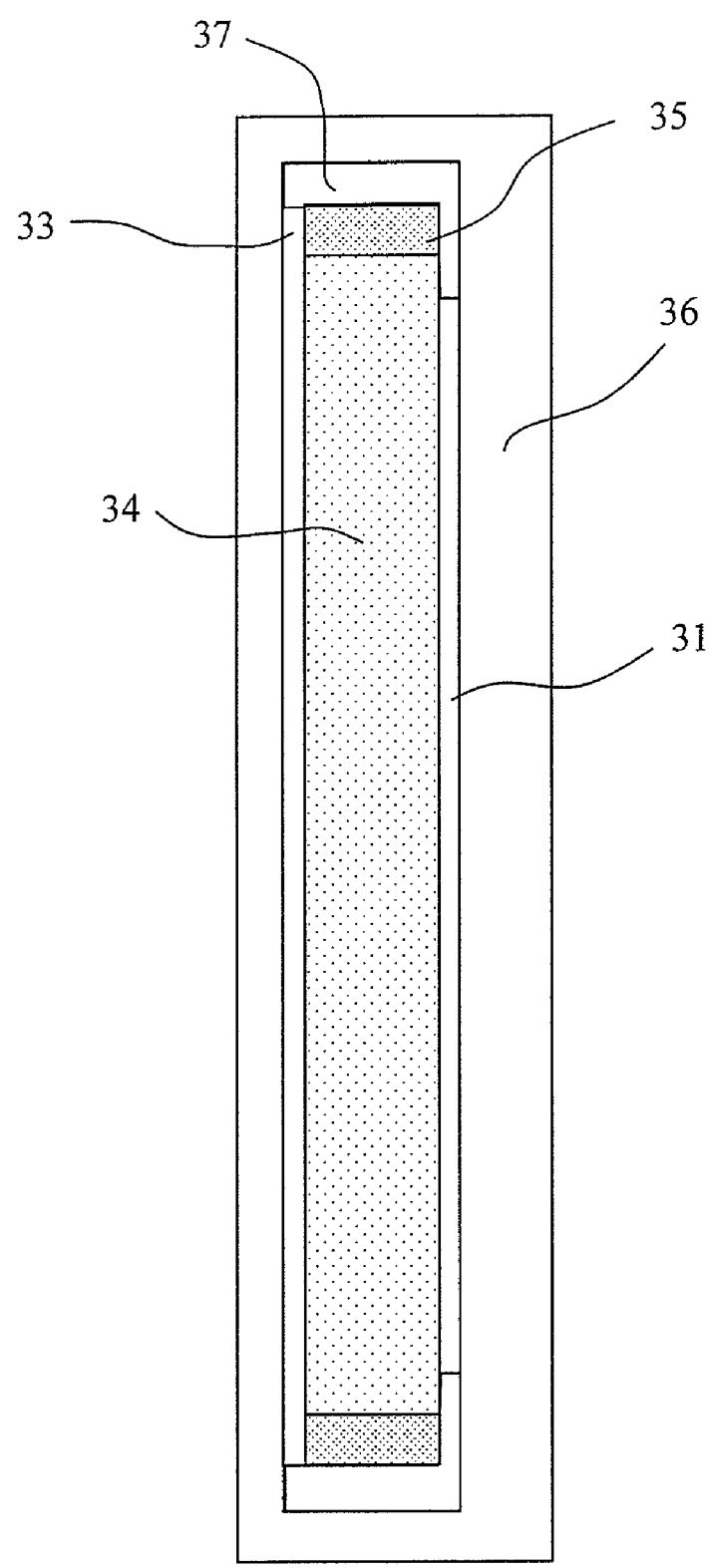
FIG. 14 is a cross-section view in the vertical direction of the modeled stator portion in the motor in the mold at a different position from that in FIG. 13.

FIG. 14 is a cross-section view of the whole region in the r-z directions in the portion D-D in FIG. 12. In this cross-section, above and below the core 31, the cross-section view of the whole region in the r-z directions is. In this cross-section, the space/obstacle combination model (2) 35 is placed above and below the core 31, and connected to the space/obstacle combination model (1) 34 on the side face of the core 31.

Figure 15:
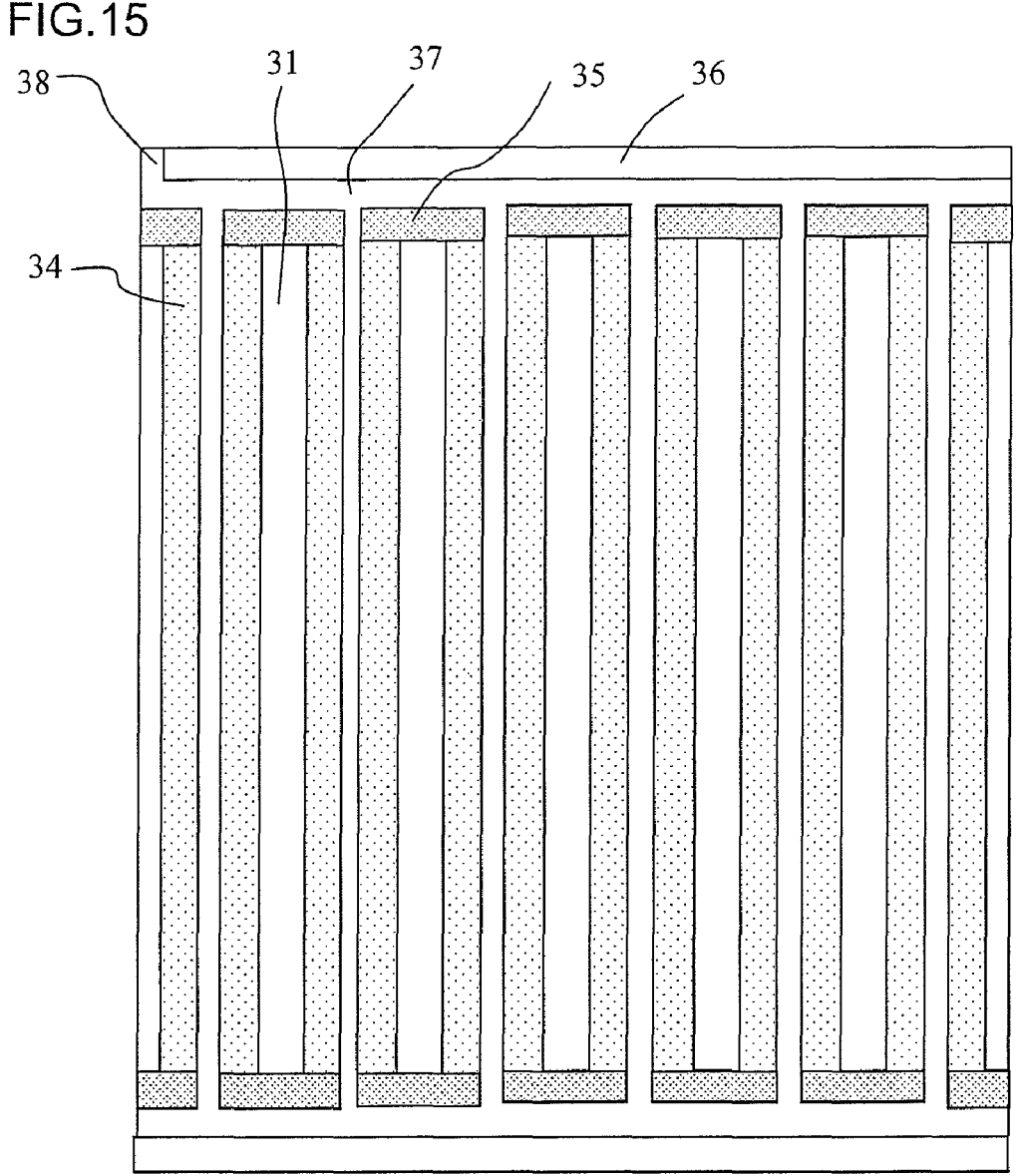
FIG. 15 is a cross-section view in a circumferential direction of the modeled stator portion in the motor in the mold.

FIG. 15 is a cross-section view of half of the circumference in the z-θ directions at a position in the r direction where a gate 38, which is a resin injection portion in the model shown in FIGS. 12 to 14, is installed. In addition, the gate 38 is provided at one place, and half of the circumferential portion not shown is also filled symmetrically with resin. The space/obstacle combination model (1) 34 is placed on the right and left sides of each core 31, and the space/obstacle combination model (2) 35 is placed above and below each core 31. The cavity portion 37 is provided in the mold 36 to surround the space/obstacle combination model (1) 34 and the space/obstacle combination model (2) 35.

Next, the analysis results of a resin filling state in the cross-section in FIG. 15 will be shown referring to FIGS. 16 to 20 (15-(*a*) to 15-(*e*)).

Figure 16:
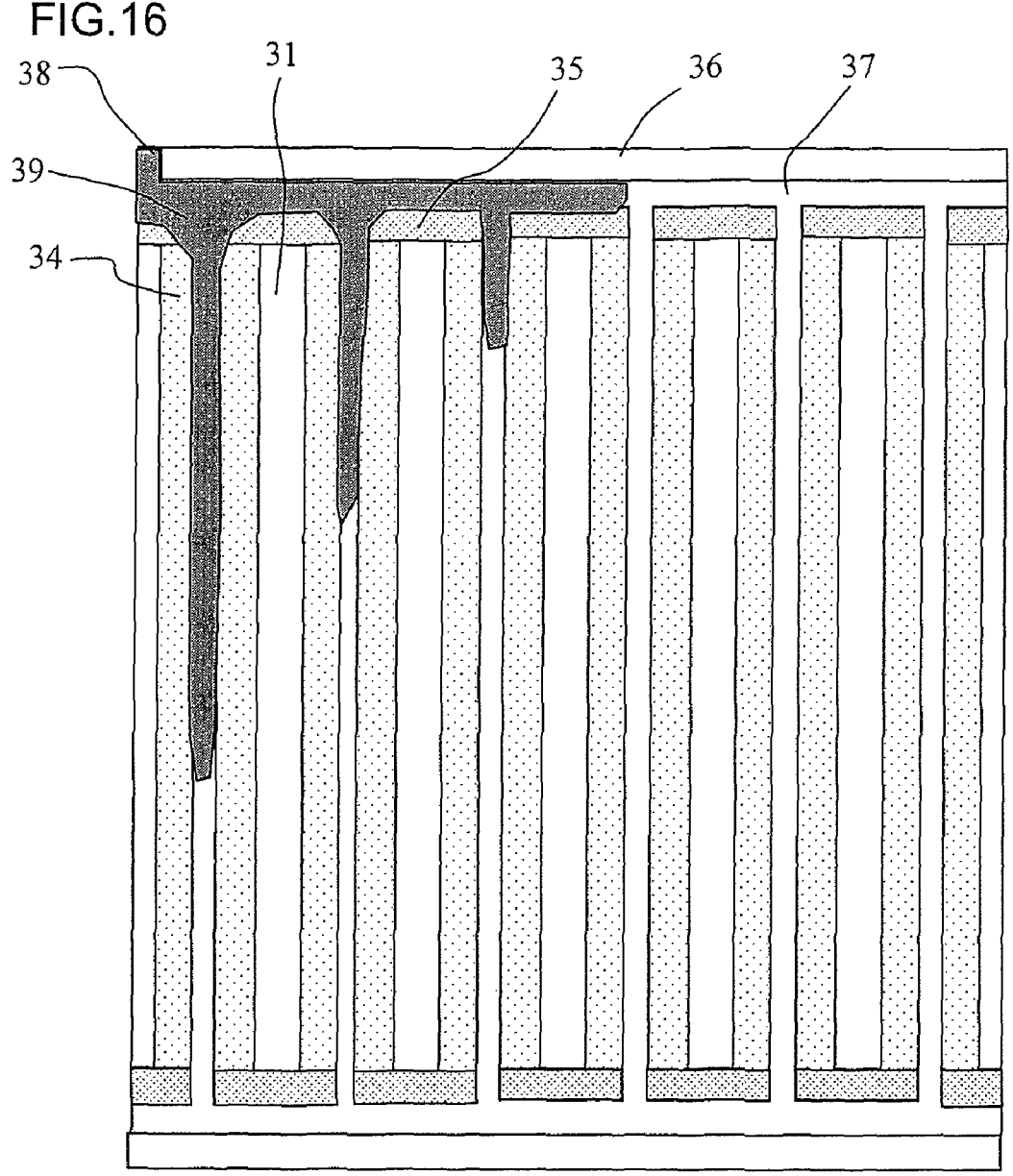
FIG. 16 shows the result of resin filling analysis 15-(a) in a cross-section in FIG. 15.

A view 15-(*a*) in FIG. 16 shows a state of the cross-section in FIG. 15, five sec. after the start of injecting resin. The resin 39 which has passed through the gate 38 branches and flows in the cavity 37, and upstream, filling the space/obstacle combination model (2) 35 and the space/obstacle combination model (1) 34 also starts.

Figure 17:
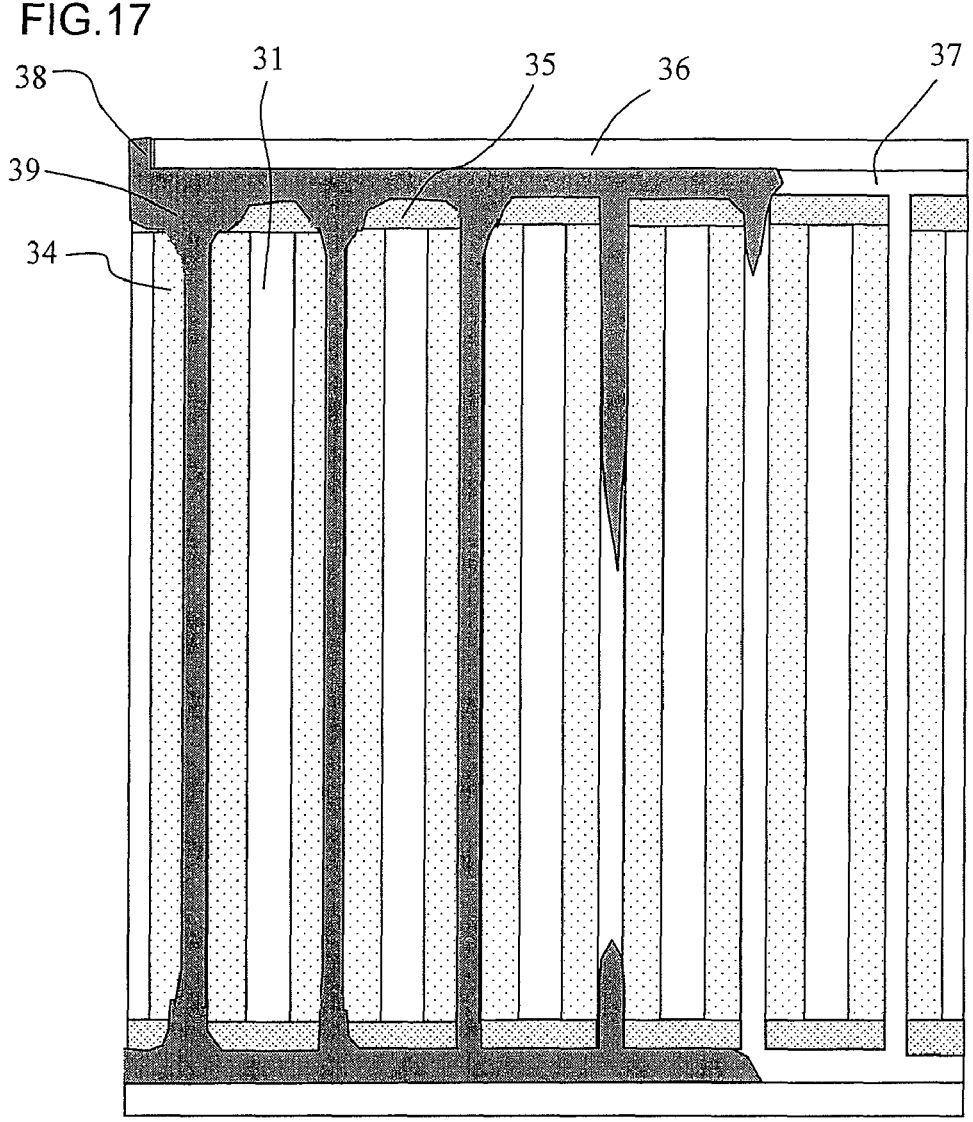
FIG. 17 shows the result of resin filling analysis 15-(b) in the cross-section in FIG. 15.

A view 15-(*b*) in FIG. 17 shows a state of the cross-section in FIG. 15, fifteen sec. after the start of injecting resin. The resin 39 which has passed through the gate 38 branches and flows in the cavity 37, and upstream, filling the space/obstacle combination model (2) 35 and the space/obstacle combination model (1) 34 further progresses.

Figure 18:
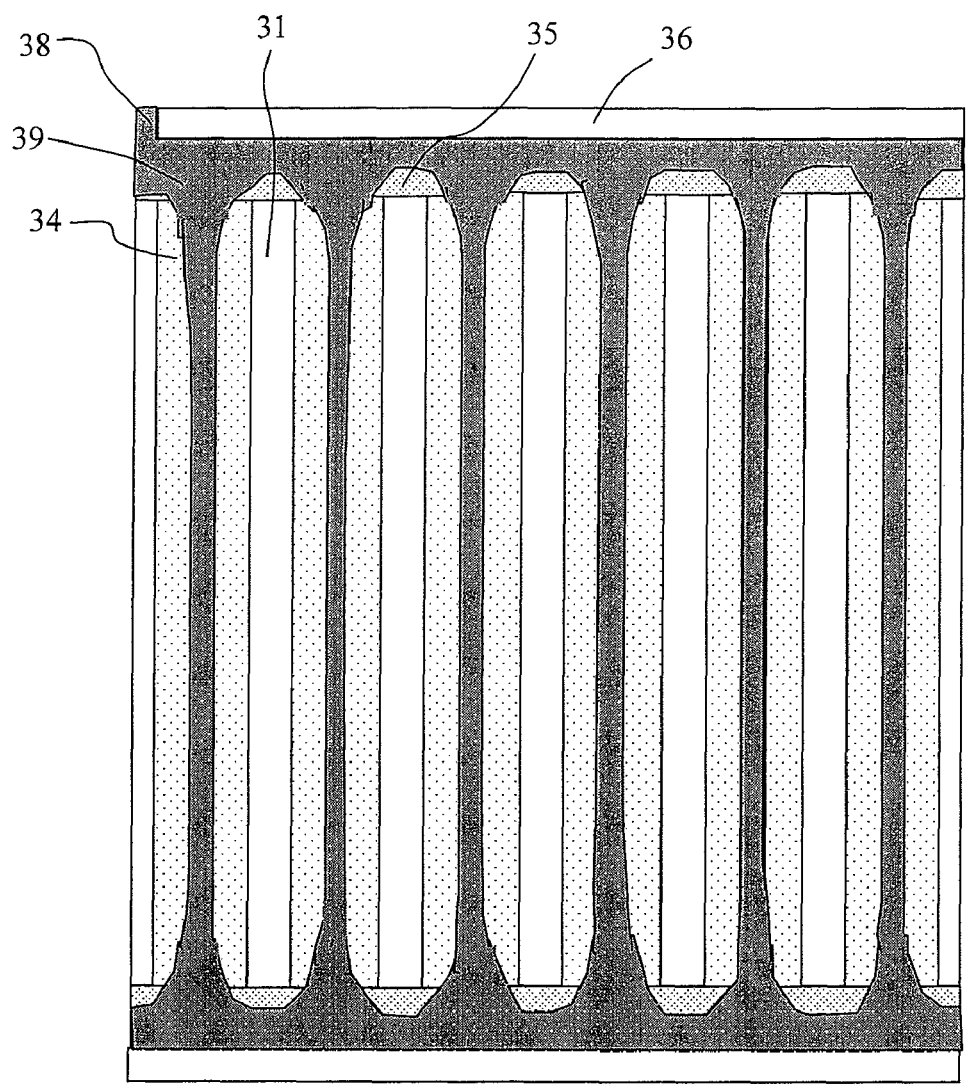
FIG. 18 shows the result of resin filling analysis 15-(c) in the cross-section in FIG. 15.

A view 15-(*c*) in FIG. 18 shows a state of the cross-section in FIG. 15, 25 sec. after the start of injecting resin. At this time, filling the cavity 37 with the resin 39 has been completed.

Figure 19:
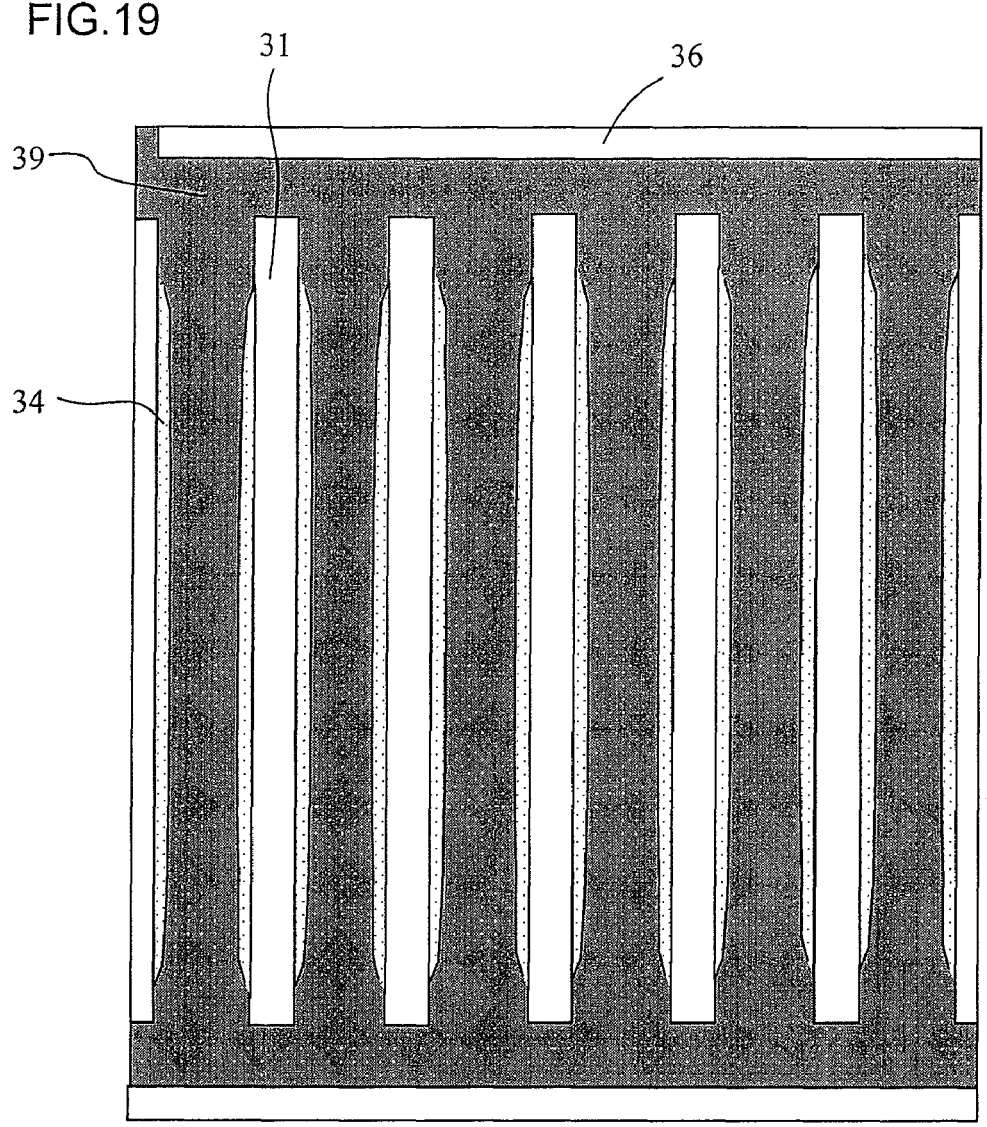
FIG. 19 shows the result of resin filling analysis 15-(d) in the cross-section in FIG. 15.

A view 15-(*d*) in FIG. 19 shows a state of the cross-section in FIG. 15, 27.5 sec. after the start of injecting resin. At this time, filling the space/obstacle combination model (2) 35 with the resin 39 has been completed, and only the space/obstacle combination model (1) 34 is being filled.

Figure 20:
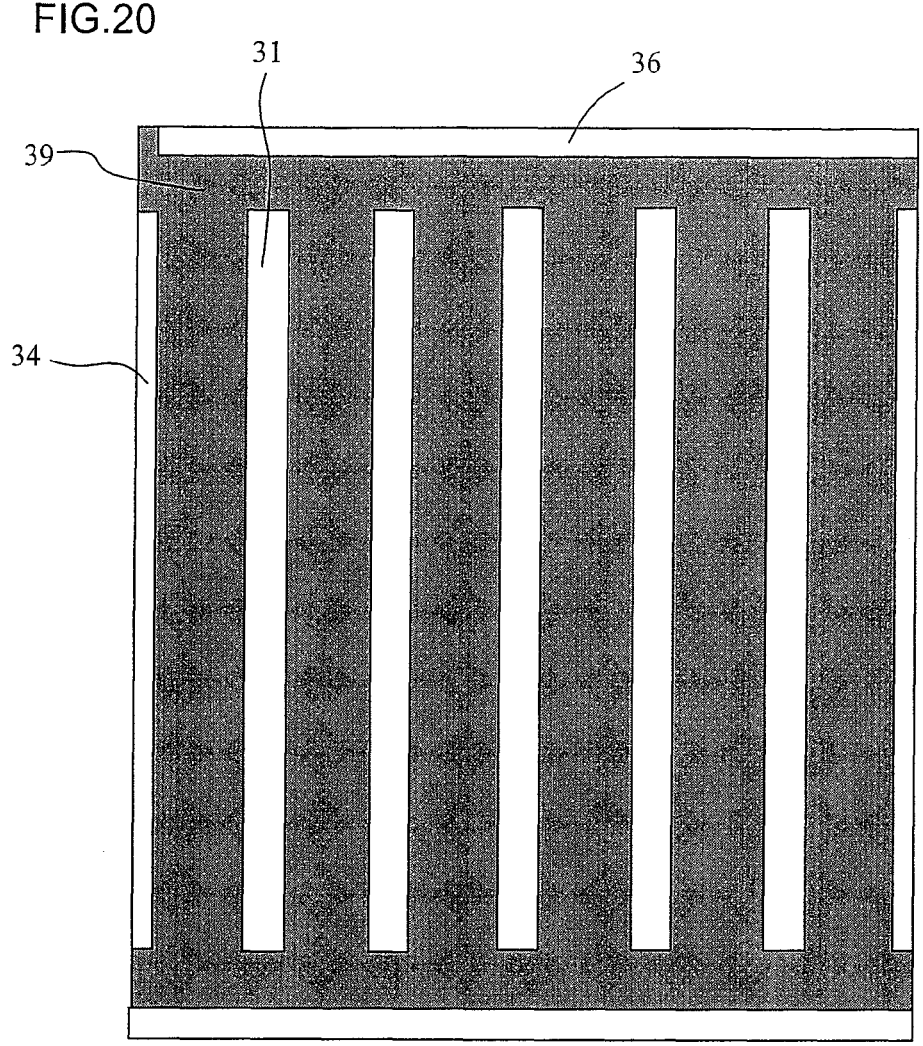
FIG. 20 shows the result of resin filling analysis 15-(e) in the cross-section in FIG. 15.

A view 15-(*e*) in FIG. 20 shows a state of the cross-section in FIG. 15, 30 sec. after the start of injecting resin. At this time, filling the space/obstacle combination model (1) 34 also has been completed, and all the flow paths have been filled with the resin 39, and the conditions of end of analysis are met, then the analysis ends here.

Next, the analysis results of a resin filling state in the cross-section in FIG. 12 will be shown referring to FIGS. 21 to 25 (12-(*a*) to 12-(*e*)).

Figure 21:
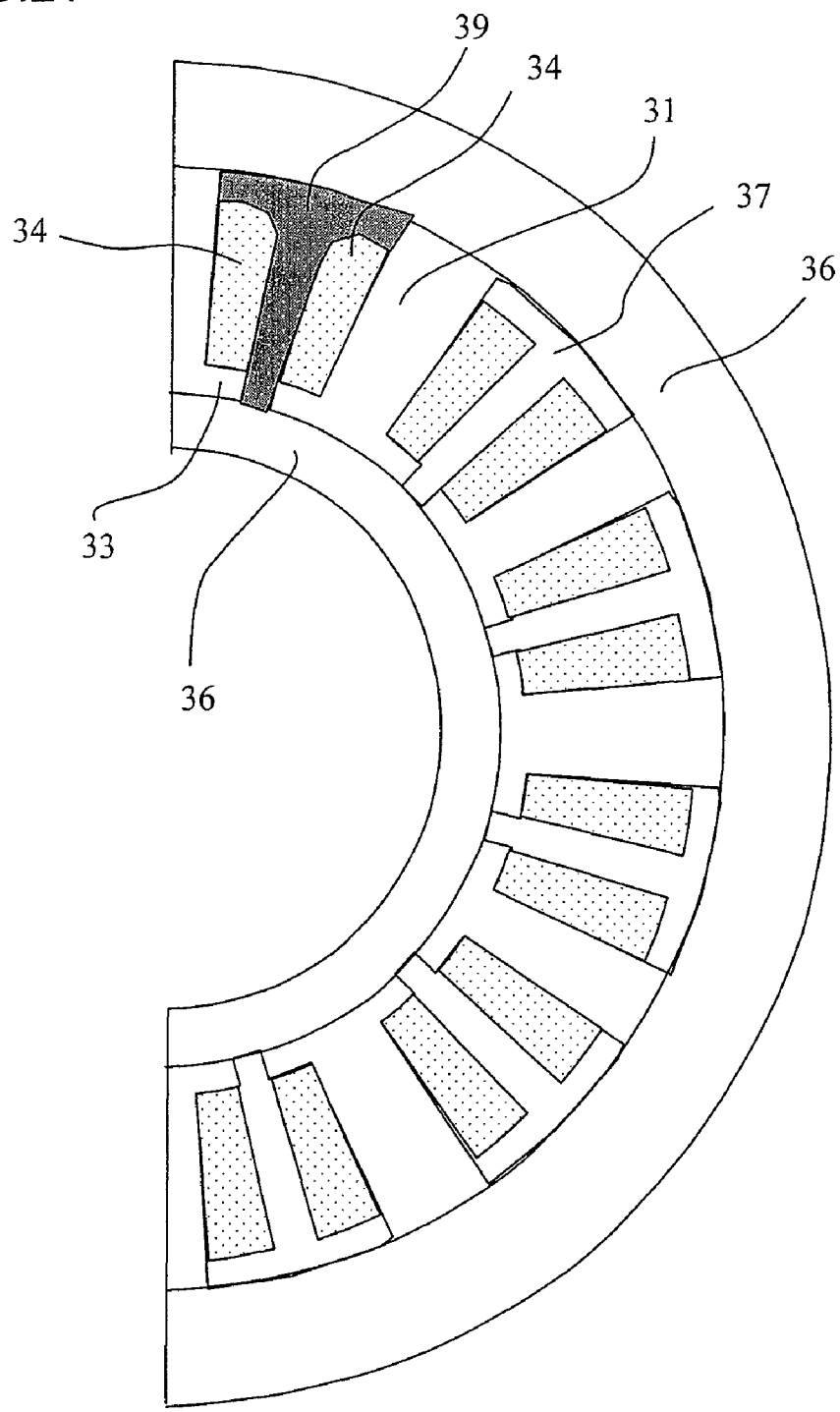
FIG. 21 shows the result of resin filling analysis 12-(a) in a cross-section in FIG. 12.

A view 12-(*a*) in FIG. 21 shows a state of the cross-section in FIG. 12, five sec. after the start of injecting resin. Filling the cavity near the gate 38 (not shown) with the resin 39 starts, and also filling the space/obstacle combination model (1) 34 with a part of the resin 39 starts.

Figure 22:
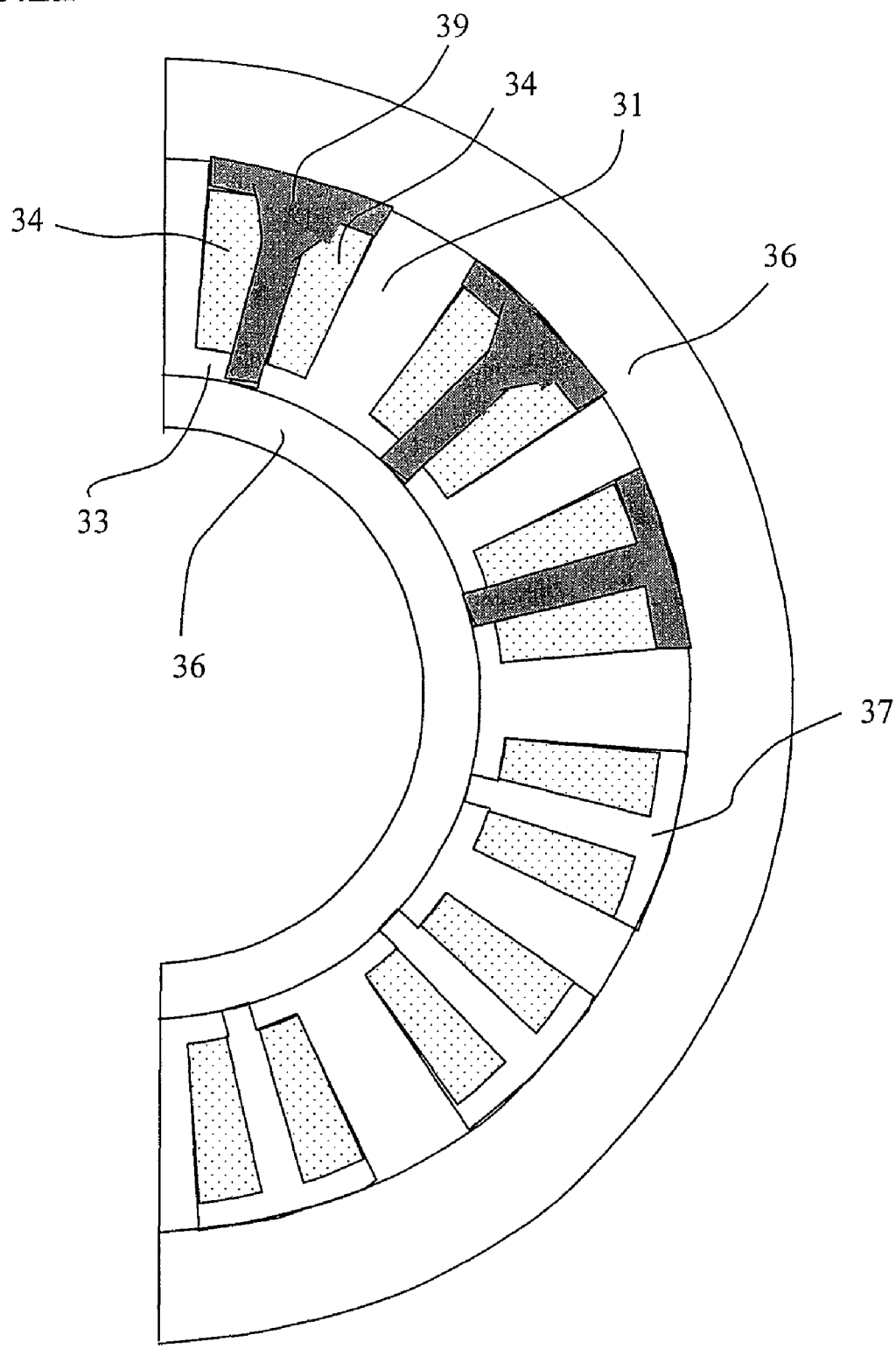
FIG. 22 shows the result of resin filling analysis 12-(b) in the cross-section in FIG. 12.

A view 12-(*b*) in FIG. 22 shows a state of the cross-section in FIG. 12, fifteen sec. after the start of injecting resin. The filling of the cavity 37 further progresses, and upstream, the filling of the space/obstacle combination model (1) 34 further progresses.

Figure 23:
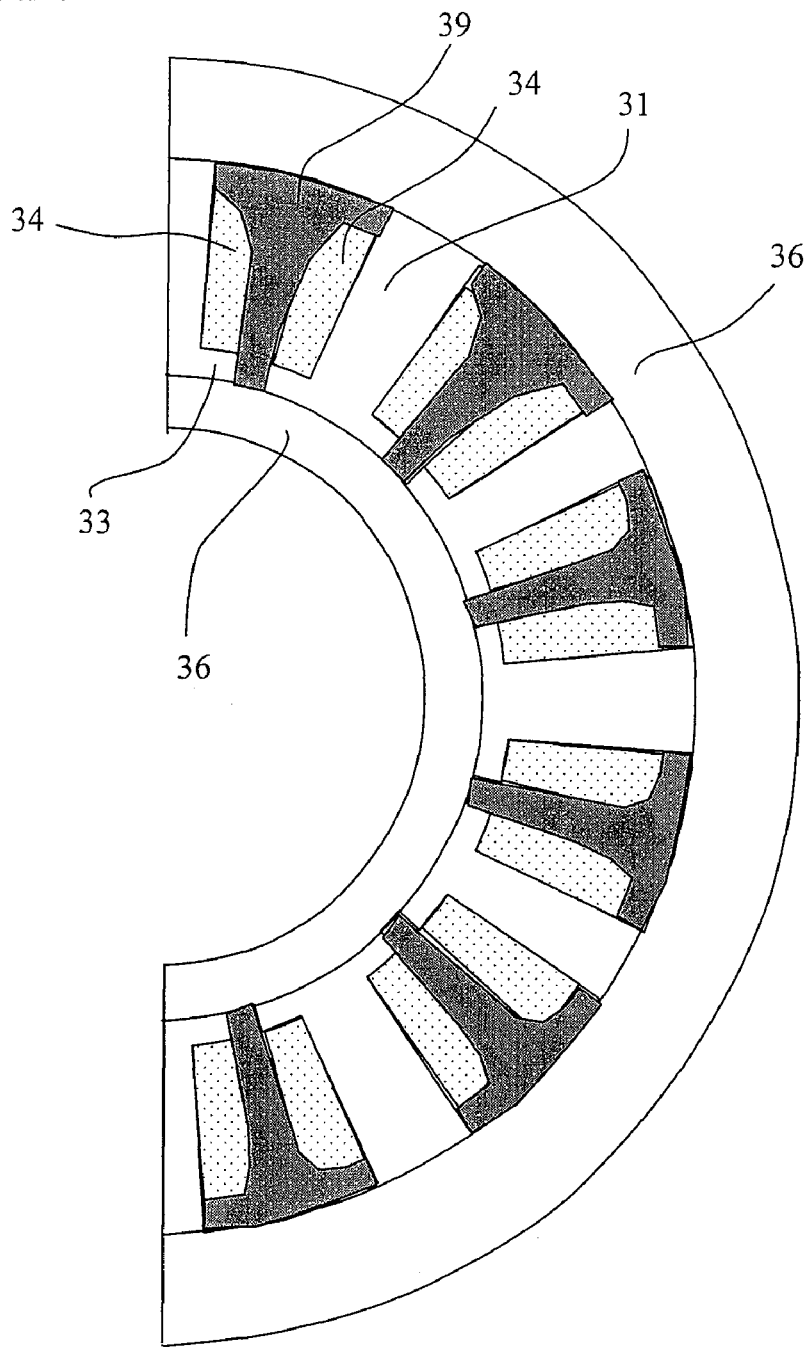
FIG. 23 shows the result of resin filling analysis 12-(c) in the cross-section in FIG. 12.

A view 12-(*c*) in FIG. 23 shows a state of the cross-section in FIG. 12, 25 sec. after the start of injecting resin. At this time, the filling the cavity 37 has been completed.

Figure 24:
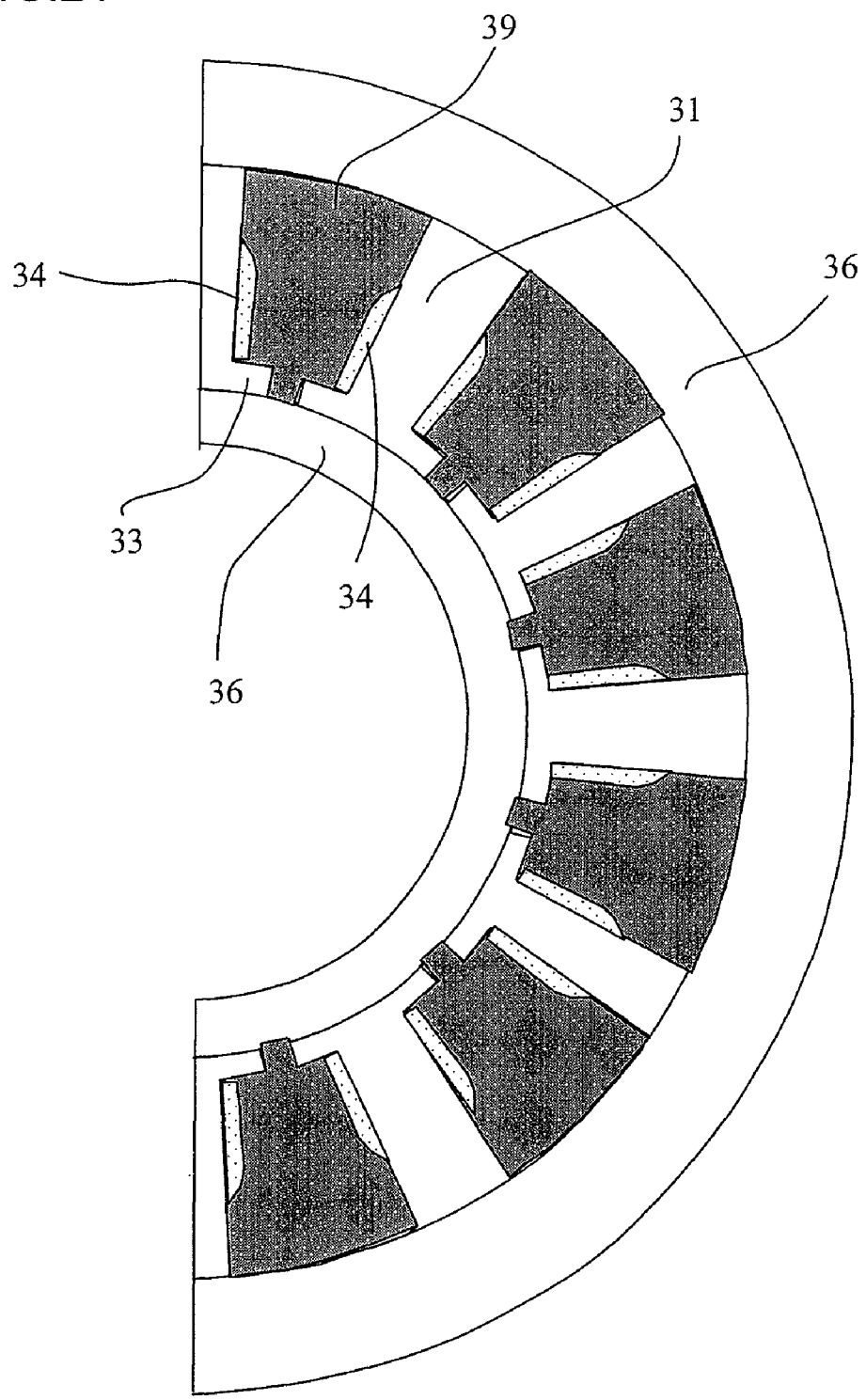
FIG. 24 shows the result of resin filling analysis 12-(d) in the cross-section in FIG. 12.

A view 12-(*d*) in FIG. 24 shows a state of the cross-section in FIG. 12, 27.5 sec. after the start of injecting resin. At this time, only the space/obstacle combination model (1) 34 is being filled.

Figure 25:
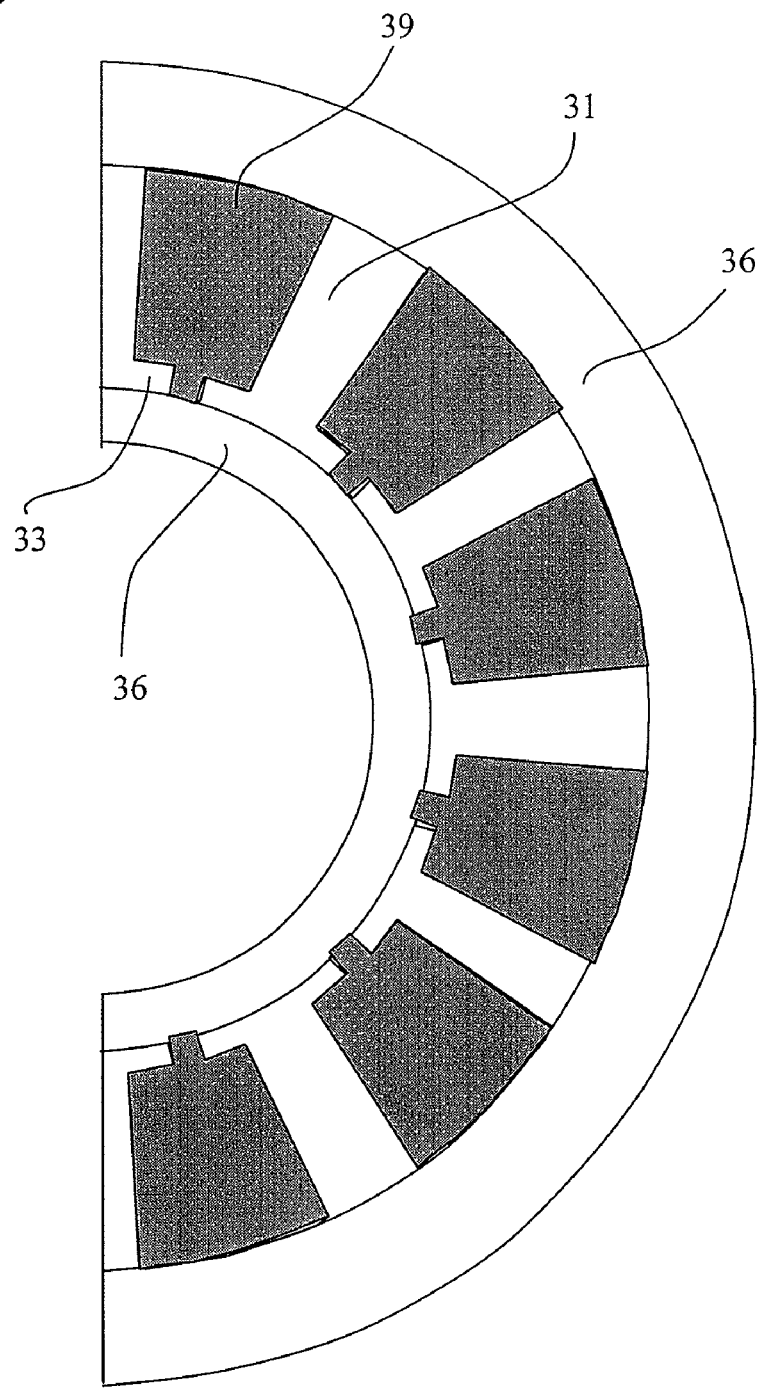
FIG. 25 shows the result of resin filling analysis 12-(e) in the cross-section in FIG. 12.

A view 12-(*e*) in FIG. 25 shows a state of the cross-section in FIG. 12, 30 sec. after the start of injecting resin. At this time, the filling the space/obstacle combination model (1) 34 also has been completed, and all the flow paths have been filled with the resin 39, and the conditions of end of analysis are met, then the analysis ends here. As described above, the present embodiment allows for a detailed flow analysis of thermosets in the mold including a complex obstacle such as a coil.

Second Embodiment

Next, a second embodiment of the present invention will be described. In the first embodiment, the viscosity is shown as the function of temperature and time, and the viscosity change is computed to the gel time. Physical property change of thermosets in such a manner is caused by advancement of curing reaction, and in the present embodiment, the viscosity computation and the flow analysis are based on an expression describing change in a degree of cure.

Figure 26:
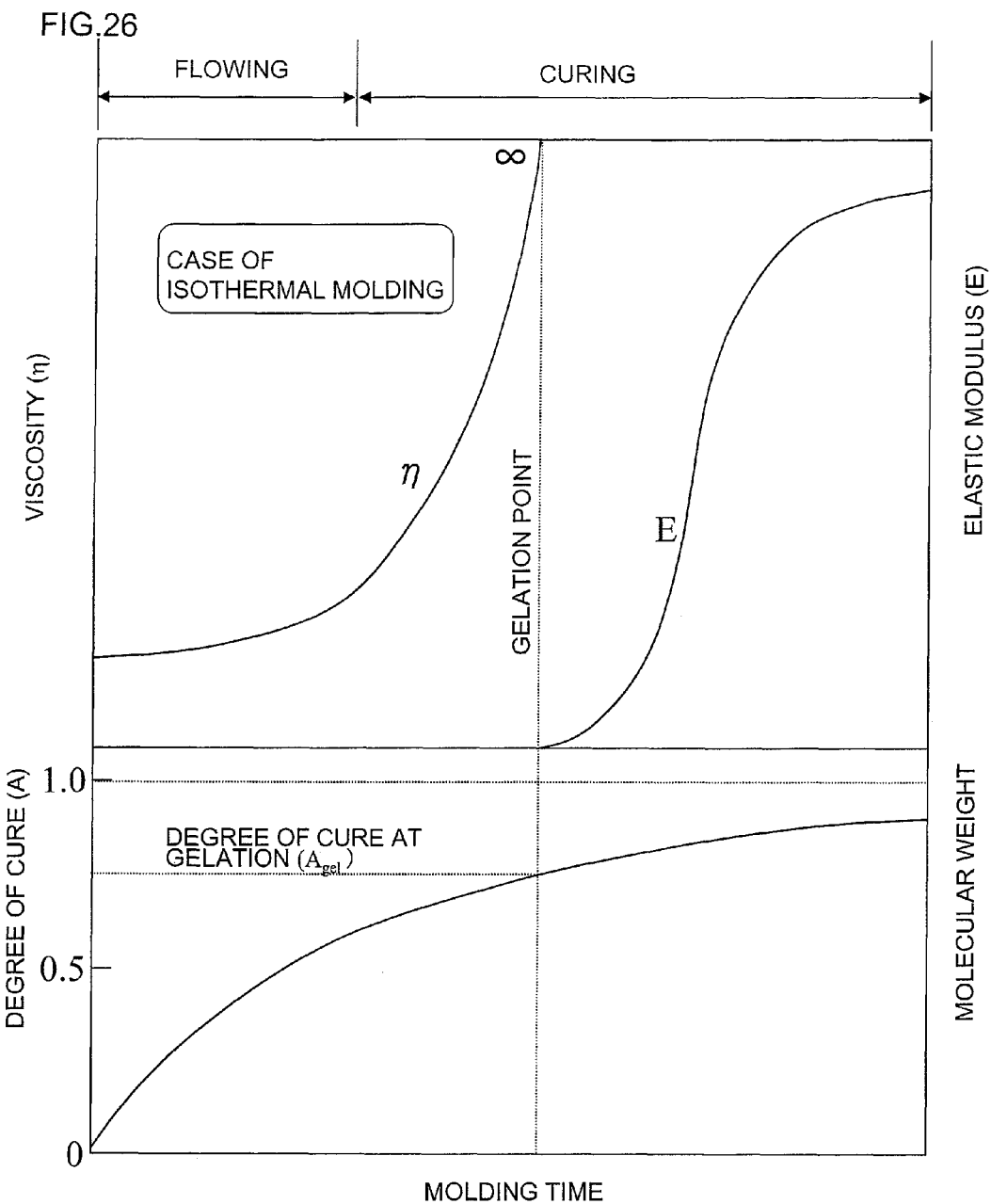
FIG. 26 is a view for illustrating change in a degree of cure A, viscosity η and an elastic modulus E relative to a molding time of thermosets.

FIG. 26 shows change in properties of thermosets in an isothermal state. Here, FIG. 26 shows a molding time and change in the properties in isothermal molding. As curing reaction of thermosets advances with time, a degree of cure A and a molecular weight increase. Accordingly, in the isothermal state, viscosity η of fluid rises. Fluid can flow when the viscosity is still in a low region. The viscosity continues to increase in an exponential manner, and becomes infinite when the degree of cure reaches a degree of cure at gelation $A_{gel}$, then gelation occurs. The resin may be viewed as a solid after gelation, and the curing reaction continues to increase an elastic modulus E, and as the end of the curing reaction nears, the elastic modulus E gets saturated. The change in the degree of cure described above is computed, which allows for analysis including change in the properties after gelation.

Figure 27:
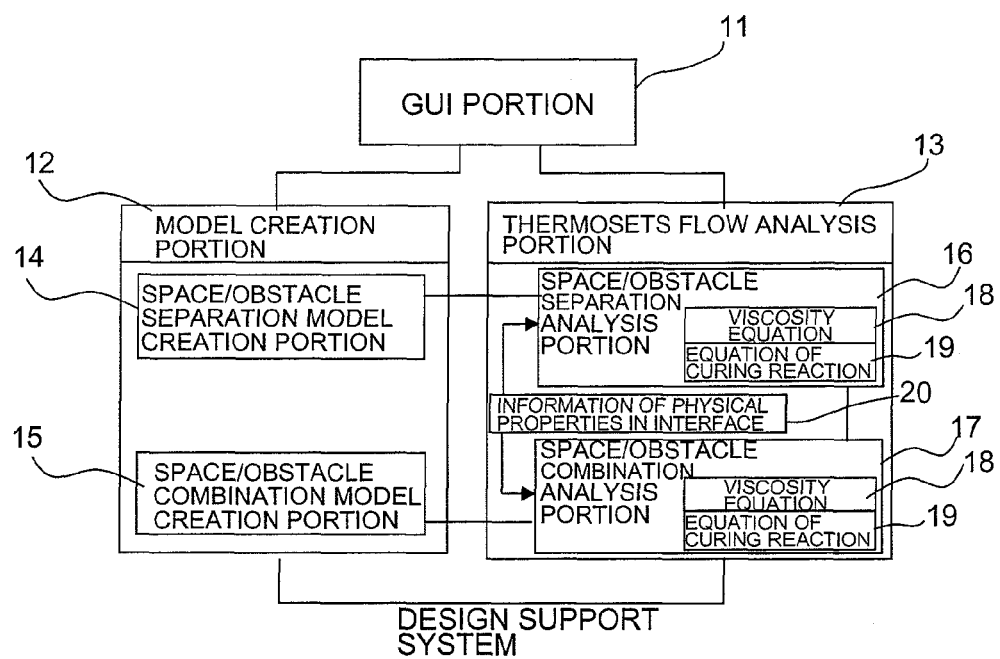
FIG. 27 is a schematic diagram of a configuration of a design support system of a second embodiment of the present invention.

FIG. 27 schematically shows a design support system of the second embodiment. A general configuration of the design support system of the second embodiment is also the same as that in FIG. 1. A different point is that an equation of curing reaction 19 is added to the space/obstacle separation analysis portion 16 and the space/obstacle combination analysis portion 17 in the thermosets flow analysis portion 13 to compute a degree of cure and a heat generation rate due to the curing reaction. An implementing means for the design support system, in the second embodiment, is also the same as that in FIG. 2.

Figure 28:
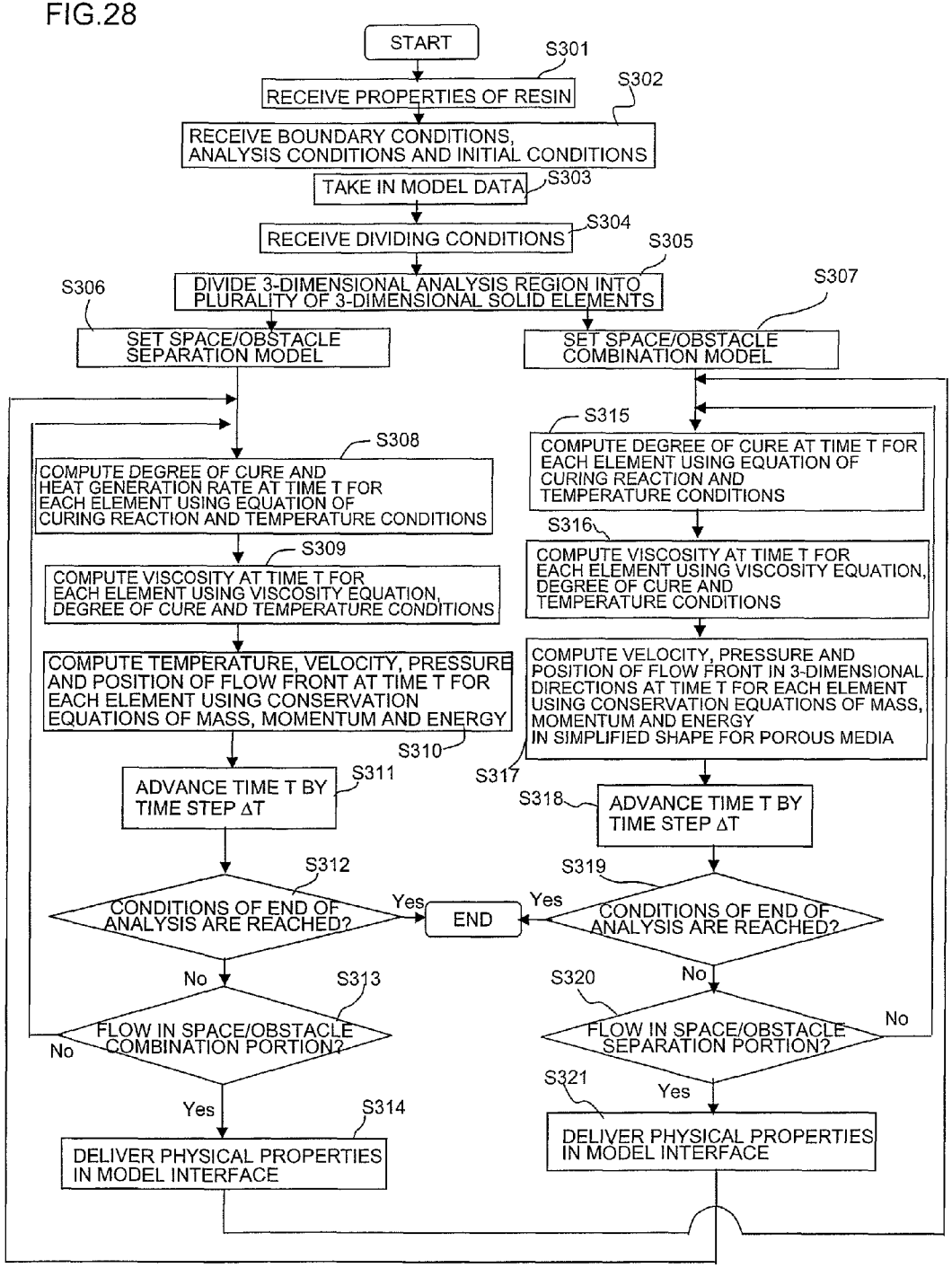
FIG. 28 is a flow diagram for illustrating 3-dimensional flow analysis processing of the second embodiment of the present invention.

FIG. 28 is a flow diagram for illustrating processing of the support system described above. The thermosets flow analysis portion 13 receives properties of thermosets necessary for 3-dimensional flow analysis from a user through the GUI portion 11 (S301). In the present embodiment, the properties are coefficients in the equation of curing reaction 19 and the viscosity equation described below, specific heat, density, thermal conductivity and the like.

Next, the thermosets flow analysis portion 13 receives various conditions for 3-dimensional flow analysis from the user through the GUI portion 11 (boundary conditions, analysis conditions and initial conditions) (S302). The various conditions include an initial temperature, an inflow velocity, a mold temperature, shape data of an injection portion and conditions of end of analysis (upper limits of a degree of cure, a flow time, viscosity and pressure, and the like).

The model creation portion 12 receives a command for 3-dimensional flow analysis from the user through the GUI portion 11. Model data specified by the command is taken in the model creation portion 12 (S303). Next, the model creation portion 12 sets a resin filling region specified by the taken in data to a 3-dimensional analysis region. Then, the model creation portion 12 receives conditions in dividing the 3-dimensional analysis region into 3-dimensional solid elements from the user through the GUI portion 11 (the number of division, an element size and the like) (S304). Then, according to the received dividing conditions, the 3-dimensional analysis region is divided into a plurality of 3-dimensional solid regions (S305).

Next, the user selects, through the GUI portion 11, a place where a space can be directly set to be a flow path from among the plurality of 3-dimensional solid regions set in the model creation portion 12, and sets a space/obstacle separation model (S306). This is directly saved in the space/obstacle separation model creation portion 14 of the model creation portion 12. On the one hand, a place in the model data having an obstacle regularly arranged in the analysis object region and having a narrow flow space is set as a space/obstacle combination model having no boundary portion between a space and an obstacle in the space/obstacle combination model creation portion 15 (S307). A setting method thereof will be described below.

Next, a specific example of the space/obstacle separation analysis portion 16 in the thermosets flow analysis portion 13 will be described. The space/obstacle separation analysis portion 16 sets an initial time to a time t. Then, using an equation of curing reaction 20 for thermosets and the temperature conditions, a degree of cure and a heat generation rate at the time t are computed for each of the 3-dimensional solid elements (S308).

The equation of curing reaction 20 may be expressed by equations 20 to 24.

$$\partial A/\partial t = (K_1 + K_2 A^M)(1-A)^N \qquad \text{Equation 20}$$

$$K_1 = K_a \exp(-E_a/T) \qquad \text{Equation 21}$$

$$K_2 = K_b \exp(-E_b/T) \qquad \text{Equation 22}$$

$$A = Q/Q_0 \qquad \text{Equation 23}$$

$$\partial Q/\partial t = Q_0(K_1 + K_2 A^M)(1-A)^N \qquad \text{Equation 24}$$

Where, A is a degree of cure, t is time, T is temperature, $\partial A/\partial t$ is a curing reaction rate, $K_1$ and $K_2$ are coefficients indicated by a function of temperature, N, M, $K_a$, $K_b$, $E_a$ and $E_b$ are coefficients inherent to material, Q is an amount of heat generation until the time t, $Q_0$ is a total amount of heat generation until the end of curing reaction, and $\partial Q/\partial t$ is a heat generation rate. Among them, N, M, $K_a$, $K_b$, $E_a$, $E_b$ and $Q_0$ are the properties of thermosets received at step S301. Also, the temperature T is a molding condition received at step S302. The temperature T at a time after every elapse of the infinitesimal time $\Delta t$ is successively substituted in the equations 20 to 24 from the initial state, and time-variable change in the curing reaction rate and the heat generation rate can be computed, and the curing reaction rate is approximately integrated in a time axis at a time after every elapse of the infinitesimal time $\Delta t$, and time-variable change in the degree of cure can be computed.

Next, using the viscosity equation 18, the degree of cure and the temperature conditions, the viscosity at the time t is computed for each element (S309).

Further, the viscosity equation 18 may be expressed by the following equations 25 to 27.

$$\eta = \eta_0((1+A/A_{gel})/(1-A/A_{gel}))^C \qquad \text{Equation 25}$$

$$\eta_0 = a \exp(b/T) \qquad \text{Equation 26}$$

$$C = f/T - g \qquad \text{Equation 27}$$

Where, $\eta$ is viscosity, T is temperature, $\eta_0$ is an initial viscosity, A is a degree of cure, $A_{gel}$ is a degree of cure at gelation, C is a coefficient of determining viscosity rise, and a, b, f, g and $A_{gel}$ are coefficients inherent to material. In addition, a, b, f, g and $A_{gel}$ are the properties of thermosets received at step S301. Also, the temperature T is the molding condition received at step S302. The values of a, b, f, g and $A_{gel}$, the temperature and the value of A computed at S308 are substituted in the equations 25 to 27 to compute the viscosity.

Using this technique, at every change by the infinitesimal time $\Delta t$, the temperature conditions and the degree of cure at the time are successively substituted, and viscosity change peculiar to thermosets can be computed that is similar to that in FIG. 4 in the isothermal state, or to that in FIG. 5 (*b*) in the non-isothermal state.

Next, temperature, velocity, pressure, a position of flow front and the like at the time t are computed for each element using conservation equations of mass, momentum and energy (S310).

In addition, the conservation equations of mass and momentum are the same as the equations 12 and 13 in first embodiment.

Also, the conservation equation of energy may be expressed by an equation 28.

$$\rho Cp(\partial T/\partial t + v \cdot \nabla T) = \lambda \nabla^2 T + \tau^* \cdot \nabla v + \rho(dQ/dt) \qquad \text{Equation 28}$$

Where, $\rho$ is density, Cp is specific heat at constant pressure, T is temperature, t is time, v is a velocity vector, $\nabla$ is a nabla, $\lambda$ is thermal conductivity, $\tau^*$ is a deviatoric stress tensor, and Q is an amount of heat generation. The heat generation rate dQ/dt is added to the equation 14 of the first embodiment in an equation 28. The heat generation rate has been computed at S308, and using this, the temperature is computed by the equation 28. That is, the second embodiment allows for analysis including heat generation caused by the curing reaction of thermosets, which can provide more accurate analysis.

Next, the time t is advanced by a time step $\Delta t$ (S311). This prepares for analysis at a next time. Next, the conditions of end of analysis are judged (S312). Here, the values computed at S310 are compared with the upper limits of a degree of cure, a flow time, viscosity and pressure, and the like set according to the conditions received at S302, and when the conditions of end of analysis are met, the computation ends. When the conditions of end of analysis are not met, it is determined whether the thermosets flow in the space/obstacle combination portion or not (S313). That is, it is determined whether the position of flow front computed at S310 reaches the space/obstacle combination model (S307) portion or not.

Here, when the position of flow front does not reach the space/obstacle combination model (S307) portion, the process returns to S308, and computation at an updated time set at S311 is repeated. When the position of flow front reaches the space/obstacle combination model (S307) portion at S313, information 20 of physical properties in a model interface is delivered to the space/obstacle combination analysis portion 17 (S314). At this time, a place in contact with a front surface of the space/obstacle combination model (S307) portion and the physical properties of the degree of cure, the viscosity, the pressure, the temperature and the like are delivered that are necessary for the space/obstacle combination analysis portion 17.

Next, setting of the space/obstacle combination model (S307) will be described. Here, in the space/obstacle combination model creation portion 15, a relevant place of an assembly of the 3-dimensional solid elements set at S305 is divided into blocks, and each of them is assigned to the space/obstacle combination model, and an inherent flow resistances of cross-section shape $\beta x$, $\beta y$ and $\beta z$ in the 3-dimensional directions shown in the equations 17 to 19 are set for each block.

Next, a specific example of the space/obstacle combination analysis portion 17 will be described. First, using the equation of curing reaction 19 and the temperature conditions, a degree of cure at the time t is computed for each element (S315). This computational technique is the same as that shown at S308.

Next, using the viscosity equation 18, the degree of cure and the temperature conditions, viscosity at the time t is computed for each element (S316). The viscosity equation is the same as the equations 25 to 27. Here, when resin, not passing through the space/obstacle separation model region, flows in, the viscosity is computed using the temperature and the initial time set at S302 according to the initial conditions. On the one hand, when resin, passing through the space/obstacle separation model region, reaches, viscosity is newly computed using the interface information 20 necessary for viscosity computation in the equations 26 to 28, delivered at S314 for delivery of the information 20 of physical properties in the model interface.

Next, velocity, pressure and a position of flow front in the 3-dimensional directions at the time t are computed for each element using conservation equations of mass, momentum and energy directed to a simplified shape as porous media (S317). Here, because of directing to a flow path shape in which holes having the same cross-sectional shape are regularly provided in the 3-dimensional directions, respectively, as porous media, boundary conditions of the conservation equations are much simplified, and a conservation equation of momentum itself turns into a simple form as the equations 17 to 19, thus a computational time can be largely shortened.

Next, the time t is advanced by the time step Δt (S318). This prepares for analysis at a next time. Next, the conditions of end of analysis are judged (S319). Here, the values computed at S317 are compared with the upper limits of a degree of cure, a flow time, viscosity and pressure, and the like set according to the conditions received at S302, and when the conditions of end of analysis are met, the computation ends. When the conditions of end of analysis are not met, it is determined whether the thermosets flow in the space/obstacle separation portion (S320). That is, it is determined whether the position of flow front computed at S317 reaches the space/obstacle separation model (S306) portion or not.

Here, when the position of flow front does not reach the space/obstacle separation model (S306) portion, the process returns to S315 and computation at a new time set at S318 is repeated. When the position of flow front reaches the space/obstacle separation model (S306) portion at S320, information 20 of physical properties in a model interface is delivered to the space/obstacle separation analysis portion 16 (S321). At this time, a place in contact with a front surface of the space/obstacle separation model (S306) portion and the physical properties of the degree of cure, the viscosity, the pressure, the temperature and the like are delivered that are necessary for the space/obstacle separation analysis portion 16.

The technique described above can quickly and accurately analyze the flow behavior of thermosets in the flow paths having a narrow space in which obstacles are regularly arranged.

The present invention can provide a quick and accurate flow simulation of a process for encapsulating, with thermosets, a product including both of a place in which obstacles having many, very narrow gaps are regularly arranged, and a wide flow path, and, in trial production, a position where a defect occurs can be localized, and processes and a structure thereof can be optimized, and accordingly the present invention has high, industrial application potency.

What is claimed is:

1. A non-transitory computer-readable storage medium embodying a program for supporting design of a resin molded article using thermosets, the program upon implementation on a computer, effecting operations comprising:

creating a space/obstacle combination model and a space/obstacle separation model in 3-dimensional solid elements which are pre-created;

calculating a time-variable change in a viscosity of resin for each of the 3-dimensional solid elements using a viscosity equation for the thermosets, in the case of analyzing both a space/obstacle combination model and a space/obstacle separation model; and calculating temperature, pressure and velocity of resin for each of the 3-dimensional solid elements using the time-variable change in the viscosity of resin and conservation equations of mass, momentum and energy, wherein numerical calculation is performed by a finite differences method or a finite element method while information about physical properties in an interface between the space/obstacle combination model and the space/obstacle separation model is delivered to each other.

2. The non-transitory computer-readable storage medium according to claim 1, wherein the space/obstacle combination model is simplified as porous media.

3. A non-transitory computer-readable storage medium embodying a program for supporting design of a resin molded article using thermosets, the program upon implementation on a computer, effecting operations comprising:

(1) receiving properties of a resin including specific heat, density, thermal conductivity, viscosity equation and coefficients in a viscosity equation through a GUI portion;

(2) receiving boundary conditions, analysis conditions and initial conditions for analysis, including an inflow velocity of resin and a mold temperature through the GUI portion;

(3) taking in model data specified through the GUI portion and dividing an analysis region set by the model data into a plurality of 3-dimensional solid regions;

(4) setting a space/obstacle separation model and a space/obstacle combination model from among the plurality of 3-dimensional solid regions divided at the operation (3);

(5) computing viscosity at a time for each of the 3-dimensional solid regions using a viscosity equation and coefficients in a viscosity equation for thermosets input at the operation (1), in each of the space/obstacle separation model and the space/obstacle combination model set at the operation (4);

(6) computing temperature, pressure and velocity of flow for each of the 3-dimensional solid regions using a viscosity equation and conservation equations of mass, momentum and energy computed at the operation (5), in each of the space/obstacle separation model and the space/obstacle combination model;

(7) delivering temperature, pressure and velocity of flow for each of the 3-dimensional solid regions of the space/obstacle separation model computed at the operation (6) to the space/obstacle combination model and computing viscosity, temperature, pressure and velocity of flow in the space/obstacle combination model, in a region which a surface of the space/obstacle separation model is contact with that of the space/obstacle combination model;

(8) delivering temperature, pressure and velocity of flow for each of the 3-dimensinal solid regions of the space/obstacle combination model computed at the operation (6) to the space/obstacle separation model and computing viscosity, temperature, pressure and velocity of flow in the space/obstacle separation model, in a region which a surface of the space/obstacle separation model is contact with that of the space/obstacle combination model; and (9) judging an end of analysis for each of the space/obstacle separation model and the space/obstacle combination model, wherein numerical calculation is performed by a finite differences method or a finite element method.

4. The non-transitory computer-readable storage medium according to claim 3, wherein the analyzing a thermosets flow further includes:

the analyzing a region of the space/obstacle combination model and the analyzing a region of the space/obstacle separation model, both considering an equation of curing reaction.

5. The non-transitory computer-readable storage medium according to claim 4, wherein the space/obstacle combination model is simplified as porous media.

6. The non-transitory computer-readable storage medium according to claim 3, wherein in the space/obstacle combination model, an inherent flow resistance of cross-section is independently set in 3-dimensional directions.

7. The non-transitory computer-readable storage medium according to claim 6, wherein the space/obstacle combination model is simplified as porous media.

8. The non-transitory computer-readable storage medium according to claim 3, wherein in the space/obstacle combination model, an inherent flow resistance of cross-section is independently set in 3-dimensional directions, and in the space/obstacle combination analysis, the conservation equation of momentum is formed by expressing a pressure drop in the 3-dimensional directions as a product of the inherent flow resistance of cross-section, and viscosity, velocity and a flow length.

9. The non-transitory computer-readable storage medium according to claim 8, wherein the space/obstacle combination model is simplified as porous media.

10. The non-transitory computer-readable storage medium according to claim 3, wherein the viscosity equation uses an equation which is a function of temperature.

11. The non-transitory computer-readable storage medium according to claim 3, wherein the viscosity equation uses an equation which is a function of temperature and a degree of cure.

12. The non-transitory computer-readable storage medium according to claim 3, wherein the analyzing a thermosets flow further includes:

the analyzing a region of the space/obstacle combination model and the analyzing a region of the space/obstacle separation model, both consider an equation of curing reaction, and the equation of curing reaction uses an equation which is a function of temperature and a degree of cure.

13. The non-transitory computer-readable storage medium according to claim 12, wherein the space/obstacle combination model is simplified as porous media.

14. The non-transitory computer-readable storage medium according to claim 3, wherein the space/obstacle combination model is simplified as porous media.

* * * * *

UNITED STATES PATENT AND TRADEMARK OFFICE
CERTIFICATE OF CORRECTION

PATENT NO. : 8,095,348 B2
APPLICATION NO. : 12/038966
DATED : January 10, 2012
INVENTOR(S) : Saeki et al.

It is certified that error appears in the above-identified patent and that said Letters Patent is hereby corrected as shown below:

Title Page Item (54), please amend as follows:

(54)  <u>DESIGN</u> SUPPORT SYSTEM, SUPPORT METHOD AND SUPPORT PROGRAM OF RESIN MOLDED ARTICLE

Signed and Sealed this
Tenth Day of April, 2012

David J. Kappos
*Director of the United States Patent and Trademark Office*

UNITED STATES PATENT AND TRADEMARK OFFICE
CERTIFICATE OF CORRECTION

PATENT NO. : 8,095,348 B2
APPLICATION NO. : 12/038966
DATED : January 10, 2012
INVENTOR(S) : Saeki et al.

It is certified that error appears in the above-identified patent and that said Letters Patent is hereby corrected as shown below:

Title Page Item (54) and at Column 1, lines 1-3, Title should read

DESIGN SUPPORT SYSTEM, SUPPORT METHOD AND SUPPORT PROGRAM OF RESIN MOLDED ARTICLE

This certificate supersedes the Certificate of Correction issued April 10, 2012.

Signed and Sealed this
First Day of May, 2012

David J. Kappos
*Director of the United States Patent and Trademark Office*